US005596671A

United States Patent [19]
Rockwell, III

[11] Patent Number: 5,596,671
[45] Date of Patent: Jan. 21, 1997

[54] OPTICAL WAVEGUIDE DISPLAY SYSTEM

[76] Inventor: Marshall A. Rockwell, III, 303 Grenola St., Pacific Palisades, Calif. 90272

[21] Appl. No.: 232,089

[22] Filed: Apr. 28, 1994

[51] Int. Cl.$^6$ ................................................ G02B 6/00
[52] U.S. Cl. ................................................ 385/147
[58] Field of Search .......................... 385/7, 8, 14, 17, 385/18, 123, 115, 116, 131, 132, 147, 114, 901; 40/427, 547

[56] References Cited

U.S. PATENT DOCUMENTS 4,737,014  4/1988  Green ........................................ 385/129

*Primary Examiner*—Akm E. Ullah
*Attorney, Agent, or Firm*—Cooley Godward LLP

[57] ABSTRACT

A thin, large, high-definition television screen employs optical waveguides. Light (32) flows through waveguides (28) arranged, in parallel, across a substrate (64). Light from a source (44) is coupled into the waveguides using a Graded Index (GRIN) microlens array (56). Taps (37) direct light out and make it visible at different locations along the length of the waveguides. Long interaction length (8) taps with deflectors (10) are introduced which enable many waveguides to be placed side-by-side and still maintain high screen resolutions. Polymers, both electro-optic and non-electro-optic, are used in one embodiment as a waveguide building material. However, acousto-optic, thermo-optic (86) and magneto-optic effects may also be used with other materials such as glass and silicon dioxide. This display can be economically produced by forming a flexible waveguide ribbon (62) which integrates multiple waveguides (1), intensity modulators (40) and taps (38) into a single unit. Waveguide manufacturing techniques based on thermo-poling, photolocking, extruding, preform fiber-drawing, and laser milling are also discussed.

8 Claims, 25 Drawing Sheets

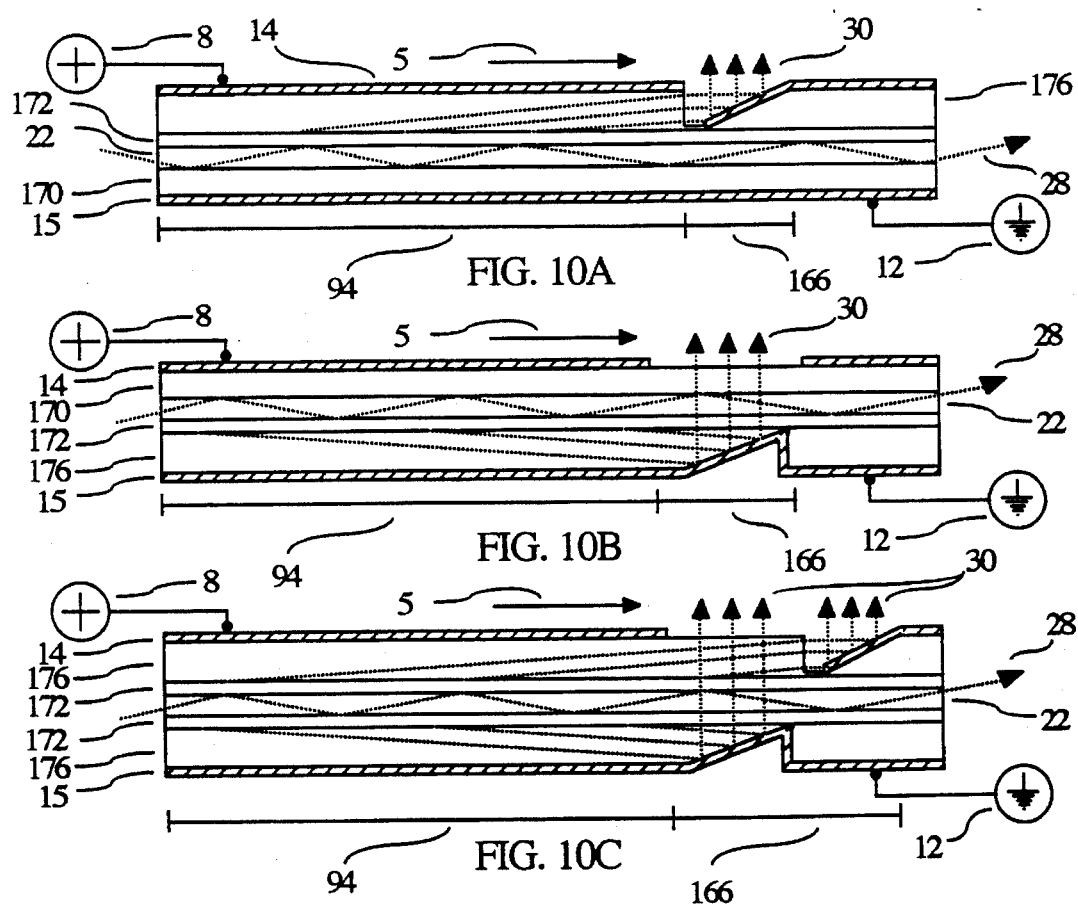
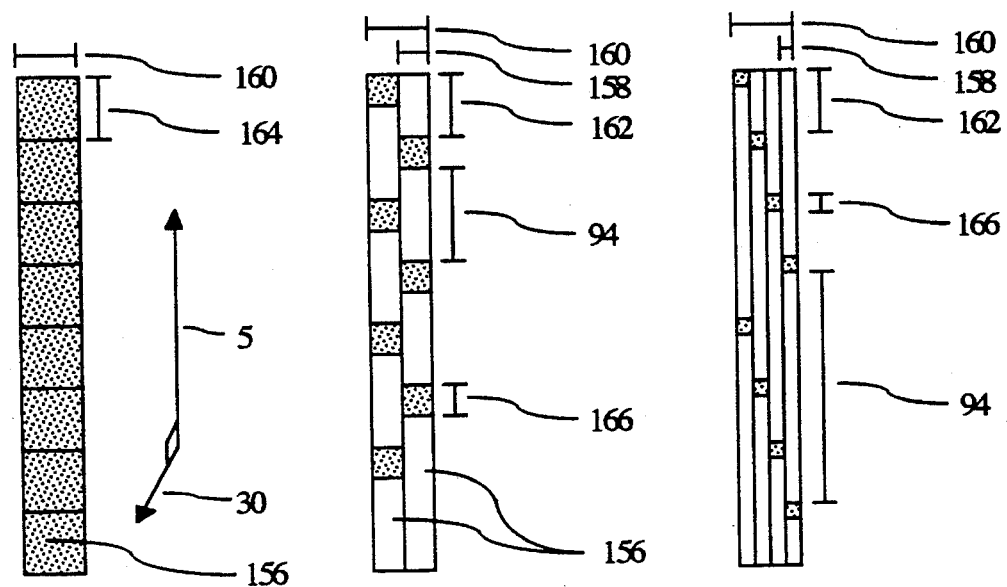

OPTICAL WAVEGUIDE DISPLAY SYSTEM

BACKGROUND OF THE INVENTION

1. Field of the Invention

This invention relates to thin panel television displays. More particularly, this application describes an optical waveguide based display technology. Specifically, a technique for tapping light out from the cores of closely spaced parallel optical waveguides is described which enables images to be formed on large viewing screens.

2. The Need for a Flat Panel Display

Since the invention of the Cathode Ray Tube (CRT), display manufacturers have wanted to make a screen which can be hung on a wall like a painting. This "moving painting" should ideally be flat, bright, large, inexpensive, rugged and with a high enough resolution, at least 1024× 1024 color picture elements or "pixels", to produce a high definition television (HDTV) image. The ability to make a thin picture screen will greatly improve the television viewing experience. For example, thin panel televisions will facilitate in-home entertainment centers. A home viewer will be able to watch theatre-quality movies without bulky and expensive projection equipment.

3. Prior Art

Liquid crystal, gas plasma, vacuum fluorescent and electroluminescent technologies are presently considered the most promising for use in thin panel displays. These technologies are similar in that they all rely on a matrix of electrodes. Electrical signals applied to the matrix of electrodes control a working medium. Commonly used working mediums include liquid crystals, neon, and phosphors. The working medium is typically sandwiched between the electrode matrix. The light emitted from a screen pixel is regulated by energizing its associated electrodes. If the proper electrical signals are rapidly applied to the electrodes, still and moving images can be formed.

In practice, large displays based on matrices of electrodes have yet to be constructed. Increasing the screen size makes the electrode geometry and composition more difficult to control during the manufacturing process. As a result, large matrix-electrode panels tend to have screen regions with irregular brightness and defective picture elements. While screen brightness irregularities can be corrected by electronically processing picture signals before they are applied to the display, defective picture elements can render a panel useless. Defective picture elements in very large displays make large matrix-electrode panels prohibitively expensive to produce. It is unlikely wall-sized, matrix-electrode, displays will become economically feasible to make in the near future.

In an effort to address these problems, a variety of less well-known display designs have been proposed. One particular design approach is based on the use of optical waveguides. Optical waveguides are capable of carrying high-intensity light long distances with little attenuation. These efficient light carrying properties make waveguides well suited for use in large screen displays.

One prior art waveguide design employs optical fibers to magnify images from an image source. For example, if the image source is a CRT, and a plurality of optical waveguides are butted to the face of the CRT, the individual fibers associated with each pixel on the CRT can carry light to a separate, larger, display panel. Each pixel from the CRT is mapped, one-to-one, onto the large panel by a dedicated fiber. If the panel is much larger than the original CRT, the fibers collectively act to magnify the picture image. Extremely large screens can be built using this fiber optic magnification technique.

When applying fiber optic magnification to HDTV, a number of problems arise. A fiber optic magnification system at a HDTV resolution requires millions of separate optical fibers. Producing a screen with millions of optical fibers is expensive. Consequently, fiber optic magnification techniques are generally considered impractical for use in high resolution displays.

An improved optical waveguide technique is based on removing, or tapping out, light from a waveguide core before it reaches the end of the fiber. Instead of using one fiber per pixel, as described above, a single fiber can be made to show many pixels. For example, multiple taps can be placed along the length of a single fiber. If the taps are scanned in rapid succession, a single fiber will appear to possess many separate light emitting elements. This greatly reduces the number of waveguides needed in a display.

A number of investigators have pursued this multiplexed, waveguide/tap, approach. The few proposed waveguide/tap designs are similar in that they have all attempted to find an efficient means of tapping light out from the waveguide core. The light tapping techniques discussed in the prior art incorporate electro-optic, thermo-optic and liquid crystal tap elements.

Perhaps the most well developed waveguide/tap display technology relies on thermally-induced phase changes in a liquid core waveguide. In this approach, a liquid core fiber is heated by an external heating element through the cladding. At a critical temperature the liquid core vaporizes, causing a sudden drop in the core's refractive index. Light traveling through the heated, vaporized, core region is caused to scatter and can be seen by a viewer.

While the liquid core technique is promising, it has several major draw-backs which are representative of the flaws in other existing waveguide/tap designs. First, the time required to cycle through a liquid-vapor-liquid phase transition is typically in the millisecond range. A millisecond is far too long to enable a single fiber to display and update thousands of pixels/second. Fiber taps must update pixels at rates greater than 30,000 pixels per second to produce a high resolution waveguide/tap display.

Second, the manufacturing processes needed to make a system of parallel liquid waveguides are new and have not been well developed. Since liquid core waveguides presently have little commercial value, they are expensive to produce. These two problems, designing high speed taps and economical optical waveguides, are common limitations to all previously proposed waveguide/tap displays, Either the taps have been too slow or the fiber elements have been too costly to produce. In other words, waveguide/tap displays have been described in theory, but have not yet been economically possible to build.

Therefore, while preliminary work has shown optical waveguide/tap displays to be promising, improvements in the light tapping, waveguide forming, and source illumination elements must be made before this technique can be commonly applied.

Examples of related patents include U.S. Pat. Nos. 3,871,747 issued Mar. 18, 1975 to Ronald Andrews; U.S. Pat. No. 4,640,592 issued Feb. 3, 1987 to Nishimura et al.; U.S. Pat. No. 3,856,378 issued Dec. 24, 1974 to Brandt et al.; U.S. Pat. No. 3,619,796 issued Nov. 9, 1971 to Seidel et al; U.S. Pat. No. 3,655,261 issued Apr. 11, 1972 to Chang.

Other related art is disclosed by Manhar L. Shah, "Fast acousto-optical waveguide modulators", *Applied Physics Letters*, Vol 23, No. 2, 15 Jul. 1973, pp. 75–77; A. I. Gudzenko et al., "Acoustooptical modulator using coupled plane waveguides", *Opt. Spectrosc.*, (USSR) 47 (4), October 1979, pp. 427–428; G. B. Brandt et al., "Bulk acoustic wave interaction with guided optical waves", *Applied Physics Letters*, Vol. 23, No. 2, 15 Jul. 1973, pp. 53–54; B. L. Heffner et. al., "Switchable fiber-optic tap using acoustic transducers deposited upon the fiber surface", *Optics Letters*, Vol. 12, No. 3, March 1987 pp. 208–210.; Ralph Th. Kersten, "Integrated optical acousto-optic switching", *Spie vol. 517 Integrated Optical Circuit Engineering*, 1984, pp. 258–266; L. Falcou et. al., "Switching characteristics of a piezoelectrical actuated evanescent-wave directional coupler", *Electron. Lett., Vol.* 23, 1987, pp. 469–470; K. Liu "Single-mode-fibre evanescent polarizer/amplitude modulator using liquid crystals", *Opt. Lett.*, Vol 11, 1986, pp. 180–182; Manhar L. Shah, "Fast acoustic diffraction-type optical waveguide modulator", *Applied Physics Letters*, Vol 23, No. 10, 15 Nov. 1973; T. Tamir et. al., *Integrated Optics, Topics in Applied Physics*, Vol 7, Springer-Verlag 1985, M. Gottlieb and G. B. Brandt, "Temperature sensing in optical fibers using cladding and jacket loss effects", *Applied Optics*, Vol. 20, No. 22, 15 Nov., 1981, pp. 3867–3873; M. Gottlieb et. al "Measurement of Temperature with Optical Fibers", *ISA Transactions*, Vol. 19, No. 4, pp. 55–62; J. R. Hill et. al., "Synthesis and Use of Acrylate Polymers for Non-linear Optics", *Organic Materials for Non-linear Optics*, Royal Society of Chemistry—Dalton Division, Oxford, 29–30 Jun. 1988, pp. 405–411; J. R. Hill et. al., "Demonstration of the linear electro-optic effect in a thermopoled polymer film", *J. Appl. Phys.*, Vol. 64, No. 5, 1 Sep. 1988, pp. 2749–2751; E. A. Chandross et. al., "Photolocking—A new technique for fabricating optical waveguide circuits", *Appl. Phys. Lett.*, Vol. 24, No. 2, 15 Jan. 1974, pp. 72–74; Hilmar Franke, "Optical recording of refractive-index patterns in doped poly—(methyl methacrylate) films", *Applied Optics*, Vol. 23, No. 16, 15 Aug. 1984, pp. 2729–2733; Takashi Kurokawa, "Polymer optical circuits for multimode optical fiber systems", *Applied Optics*, Vol. 19, No. 18, 15 Sep. 1980, pp. 3124–3129; M. Haruna and J. Koyama, "Thermooptic deflection and switching in glass", *Applied Optics*, Vol. 21, No. 19, 1 Oct. 1982, pp. 3461–3465; Andrew J. Lovinger, "Ferroelectric Polymers", *Science*, Vol. 220, No. 4602, 10 Jun. 1983, pp. 1115–1121; D. Bosc and P. Grosso, "Polymer acousto-optic modulator working at 20 Mhz", *2nd International Conference on Passive Components: Materials, Technologies, Processing, Paris, France*, 18–20 Nov. 1987, pp. 107–112; D. R. Ulrich, "Overview: Non-linear Optical Organics and Devices", *Organic Materials for Non-linear Optics*, Royal Society of Chemistry—Dalton Division, Oxford, 29–30 Jun. 1988, pp. 241–263; J. Brettle et. al., "Polymeric non-linear optical waveguides", *SPIE Vol. 824 Advances in Nonlinear Polymers and Inorganic Crystals, Liquid Crystals, and Laser Media* (1987), pp. 171–177 R. Lytel el. al., "Advances in organic electro-optic devices", *SPIE Vol. 824 Advances in Nonlinear Polymers and Inorganic Crystals, Liquid Crystals, and Laser Media* (1987), pp. 152–161; NCAP Technology Report, Taliq Corporation, Sunnyvale, Calif.

SUMMARY OF THE INVENTION

1. Objects of the Invention

Accordingly, it is an object of this invention to show how a display can be constructed by making guided light prematurely exit the cores of optical waveguides.

Another object of the invention is to show various high speed techniques for tapping light out of waveguides to form still and moving images on large screens.

A still further object of the invention is show how the acousto-optic, electro-optic and thermo-optic effects can be employed to modulate and tap light out of optical waveguides.

Another object is to show an improved waveguide tap with a long interaction region and a light-deflecting element.

Yet another object is to show a staggered, multi-waveguide, tap-arrangement method which allows high pixel resolutions to be maintained while using long interaction length taps.

Still another object is to show how to make and use a ribbon of parallel optical waveguides in waveguide-based displays.

Yet another object is to show how light absorbing material can improve the appearance of images formed in waveguide displays.

A further object is to show how filters, which convert white light into colored light, can be used to make full color waveguide displays.

Another object is to show how lenses such as a Graded Index (GRIN) or a Surface Micro Integrated Lens (SMILE) may be used to efficiently guide light from a source into many separate waveguide core elements.

Another object is to show various methods for integrating waveguide and modulator elements into a complete display system.

A further object is to describe a number of different waveguide display manufacturing techniques.

These and further objects, features and advantages of the present invention will become more obvious from the following description when taken in connection with the accompanying drawings.

2. Brief Description

Briefly described, the invention comprises a substrate with optical waveguides arranged on it. The substrate can be made of glass, plastic or any other suitable material. The waveguides are typically parallel and closely spaced next to each other. Light is directed from a continuous light source into the ends of the waveguides arranged across the substrate.

Due to total internal reflection, the guided light traveling through the optical fibers will only emerge from the ends of the fibers. Once bound in the core of a waveguide, light can not escape through the cladding layer. Consequently, a person looking at a waveguide covered substrate will normally not see light escaping from the surface of the substrate. Only light escaping from the ends of the waveguides can be directly observed.

Various methods can be used to make light prematurely exit a waveguide through the cladding material, thus making it visible. These methods rely on diffraction effects, evanescent field coupling, surface irregularities, microbending and changing the index of refraction in the waveguide core and cladding. These phenomenon can be made to occur electronically using the electro-optic, acousto-optic, thermo-optic or magneto-optic properties possessed by many materials. Any of these effects can be utilized to tap light out of a waveguide and make a display like the one described here.

For example, the acousto-optic effect causes physical displacement, which, in an optical medium, is typically accompanied by changes in the index of refraction. By applying acoustic energy to specific points, light can be made to exit anywhere along a length of waveguide. To a viewer, this tapped-out light appears as a point of light which is present at the location where acoustic energy is applied to the waveguide. The position and intensity of the emitted light can be adjusted by changing the location and power of the applied acoustic energy.

Tapping light out of the core with acoustic energy both modulates the intensity of the remaining bound light traveling through the waveguide and makes a visible point. This ability to modulate the intensity of light in a waveguide, as well as making light visible anywhere along its length, is used to make points of varying brightness along a one-dimensional segment of waveguide. To do this, an intensity modulator is followed by a series of taps placed along a waveguide segment.

The intensity modulator controls the total amount of light traveling through the core, while taps couple the remaining intensity modulated light out and make it visible at different locations along the waveguide. By placing many one-dimensional intensity modulator/tap waveguide segments in parallel, closely spaced next to each other, the light emitted from a two-dimensional surface is regulated. By orchestrating the intensity modulators and taps in a two-dimensional system of waveguides, still and moving images are formed on a viewing screen.

A different way to make a waveguide tap is based on the electro-optic effect. Electro-optic materials directly change their index of refraction in an electric field. Using electro-optic materials to construct the core, cladding and/or supercladding elements significantly lowers the power needed to drive the taps, and hence the screen. Non-linear and ferroelectric polymers are presently considered the the most promising electro-optic waveguide materials.

In the electro-optic tap interaction region, guided light is coupled out from the core, passed through the cladding, into a second waveguide running alongside the core. The second waveguide, hereinafter referred to as the "supercladding", guides light in a direction oriented parallel to the core. Light coupled out from the core travels through the supercladding until it hits a deflector. The deflector, in turn, directs light out of the supercladding to the viewer. Thus, light coupled into the supercladding from the core over a long interaction length appears as a light-emitting region in the supercladding.

This supercladding/deflector scheme, which can also be used with acousto-optic taps, enables high screen resolutions to be maintained while using long interaction length taps. Waveguides are placed side-by-side. Each waveguide contains only a small number of long interaction length supercladding/deflector taps. However, taps on separate waveguides are slightly offset, or staggered, to achieve a high resolution. The combined effect of many parallel waveguides, each with their limited number of long interaction length taps, increases the display resolution.

Finally, plastic waveguide processing techniques are described which enable large numbers of waveguides to be economically produced. Plastics can be extruded, molded, laminated, etched, doped, drawn, stamped, machined, laser or ion milled, thermo-poled and photolocked to form and shape optical waveguide elements used in display systems.

The attainment of the foregoing and related objects, features and advantages of the invention will be more readily apparent to those skilled in the art, after review of the following more detailed description of the invention, taken together with the included drawings.

BRIEF DESCRIPTION OF THE DRAWINGS

FIG. 10A is a side view of a waveguide tap showing how light is coupled out of a core into a supercladding and deflected out to the viewer.

FIG. 10B is a side view of waveguide tap showing how light is coupled out of a core into a supercladding and deflected back through the waveguide core and out to the viewer.

FIG. 10C is a side view of a waveguide tap showing how light is coupled out into two supercladdings placed on each side of a waveguide core.

FIG. 11A is a schematic view of a single waveguide with multiple small interaction length taps placed at even intervals along its length.

FIG. 11B is a schematic view of two waveguides with medium interaction length taps and staggered deflectors to achieve the same adjacent pixel resolution as shown in FIG. 2A.

FIG. 11C is a schematic view of four waveguides with long interaction length taps and staggered deflectors to achieve the same adjacent pixel resolution as shown in FIG. 2A.

DRAWING REFERENCE NUMBERS

Figure 1:
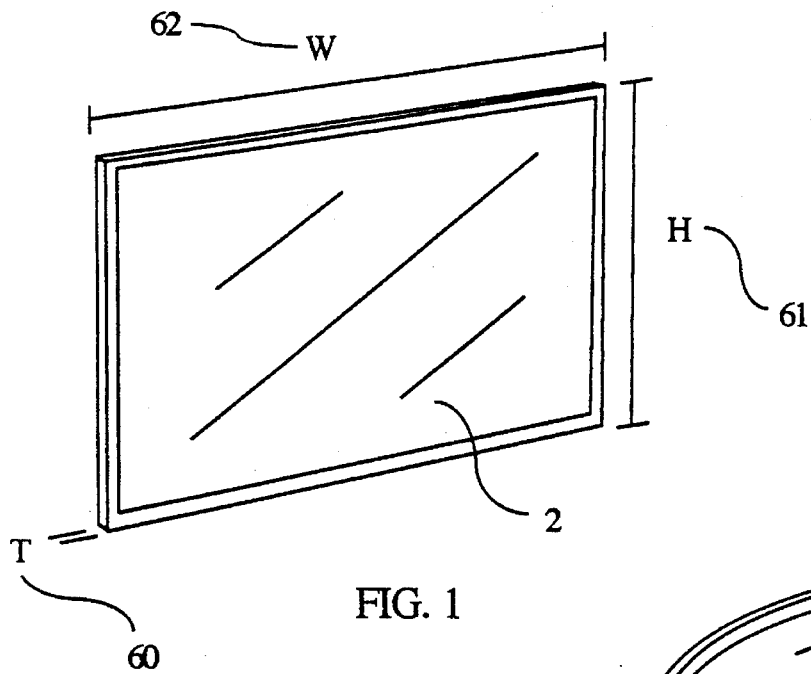
FIG. 1 is a perspective view of a flat panel display.

1 Substrate (i.e.- glass or plastic)
2 Viewing screen
3 Direction light travels to the viewer
4 Base containing decoder, drive electronics and light source
5 Direction of bound light traveling in the waveguide
6 High-voltage pulse used to create a traveling acoustic wave
7 Angle of light acceptance
8 DC voltage
9 Direction traveling acoustic wave propagates across substrate 1
10 High frequency oscillator used to drive piezoelectric layer 16
12 Ground
14 Conductor used for drive signals (i.e. - DC 8, high frequency 10 and pulse 6)
15 Conductor associated with ground 12
16 Piezoelectric material - (i.e. - ZnO or PVDF)
18 Light absorber (i.e. - black glass)
20 High index difference cladding relative to core
21 Light entering waveguide core
22 Core
24 Low index difference cladding relative to core
26 Light diffusing material
27 Bound light in waveguide
28 Bound light that travels to the viewer from the waveguide
30 Light viewer can see from the diffusing material
32 Bound light coupled out of waveguide core and being scattered by the layer
34 Acoustic wave
35 Regions where there is little acoustic energy
36 Total internal reflection
38 Total internal reflection in acoustic field because of high refractive index difference between cladding and core
40 Bend region where light can escape the core
42 Electro-optic material
44 Total internal reflection in bend due to high index difference between the cladding and core
46 Electric field
48 Transparent conductor
50 Point light source
52 Focusing lens
54 Prism coupler
55 Air gap for evanescent coupling
56 Light from light source
58 Penetration into electro-optic material
60 Panel thickness
61 Panel height
62 Panel width
64 Conductor associated with tap
66 Conductor associated with intensity modulator
68 Light exiting core at tap 64
70 Light exiting core at intensity modulator 66
72 Traveling acoustic wave used to cause bending region 72
74 Direction of wave travel
76 Acoustic focusing horn
78 Movement of horn due to acoustic wave 34
80 Two-sided PC board
82 Integrated circuit
84 Xenon arc lamp
86 Optical waveguides deposited on substrate 1
90 Beam focused onto ends of waveguides 86
91 Intensity Modulator Element
92 Waveguides deposited over light diffusing material 26
94 Interaction region where light is tapped out of the waveguide
95 Ribbon waveguide cores imbedded in cladding material
96 Cladding material with large index difference relative to ribbon cores
98 Cladding material with small index difference relative to ribbon cores
100 Opaque medium imbedded in ribbon light diffusing material 131
102 Bend where ribbon is folded to change direction 90 degrees
104 Ribbon ground conductor
106 Ribbon modulator and tap conductor
108 Small intensity modulator signal 110 Large intensity modulator signal
112 Tap drive signal
114 Large amount of light emitted from modulator associated with large drive signal 110
116 Some light emitted from modulator associated with small drive signal
118 No light emitted from modulators with no drive signal 126
120 No light emitted from tap associated with modulator 114
122 Large amount of light emitted from taps associated with modulators
124 Some light emitted from tap associated with modulator 116
126 Modulator conductors with no electric drive signal
128 Tap being driven with signal from source 112
130 Waveguide ribbon
131 Ribbon light diffusing material
132 Line-type light source
133 Collimated beam of light
134 Colored light after leaving filter
135 Focused light entering stack of ribbons
136 Stack of ribbons
138 Focusing element to direct light into ribbon cores
140 Color filter unit
142 Focusing unit takes collimated light and directs it into cores in a stack of ribbons
144 Opaque material over clear substrate 1
146 Opening in opaque cover 144 to allow light from ribbon taps 148 to reach viewer
147 Ribbon modulator conductor
148 Ribbon tap conductor
150 Space between ribbons
152 Segment of PC board that modulates light-flow in waveguides - contacts 147 & 104
154 Segment of PC board that controls where light exits - contacts taps 156 Red, Green and Blue (RGB) elements of filter
156 Optical Waveguides
158 Width of a single waveguide
160 All of the waveguides in a column oriented direction 5
162 Pixel spacing when more than one waveguide is in a column 3
164 Pixel spacing in a single waveguide column 3
166 Light deflection region - where light in the super cladding is directed out to the viewer
168 Ground Conductor for intensity modulators
170 Cladding
172 Thin-layer cladding (i.e. - electro-optic)
174 Isolation layer (clear optical, metallic or opaque material)
176 Supercladding (i.e. - electro-optic)
178 Dark layer to improve screen contrast ratio
180 Intensity modulator ribbon deflector elements
182 Tap conductor element extends to edge of ribbon
184 Fingers on taps correspond to a vertical column 3
186 Deflector regions on ribbon direct tap supercladding light to the viewer
188 Interaction region 8 for intensity modulators
190 Intensity modulator spacing
191 Ribbon intensity modulator
192 Large size bonding pads associated with intensity modulators
194 Point light source
196 Heat
198 Width of the waveguide ribbon
200 Roll of unprocessed plastic
202 Direction that roll is unwinding
204 Plastic sheet before treatment to form waveguides
206 Laser for photolocking
208 Beams of light passing through the plastic sheet 204
210 Direction of waveguide movement
212 Different index waveguide regions formed by photolocking
214 Contact electrodes
216 Waveguide regions formed by electro-poling
218 Container
220 Molten plastic
222 Extrusion nozzle
224 Pulling rollers
226 Individual extruded waveguides
228 Direction of preform movement
229 Furnace
230 Multi-waveguide preform
232 Opaque outside of waveguide
233 Soft region
234 Cladding
235 Multi-core preform
236 Supercladding
238 Thin cladding between core and supercladding
240 Second core
242 Multi-core fibers
244 Laser
245 Modulated scanning light beam
246 Light modulator
248 Direction of mirror spinning
250 Multi-faceted mirror
252 Mirror drive motor
254 Lens
256 Reel with metalized piezoelectric film on it
258 Sheet of metalized film
260 Direction of film movement
262 Completely processed metalized PVDF film
263 Spools with waveguide wrapped on them
264 Direction individual waveguides move before being attatched to the piezoelectric film
266 Pressure rollers
268 Piezoelectric film with waveguides attached to it
270 Spool with film and waveguides attatched to it
272 Spool with pitted waveguide film
274 Spool with pitted and metalized waveguide film
276 Vaporized metal
278 Spool of waveguide lenses
279 Rollers
280 Spool with pitted and metalized waveguide film
282 Information Controller
284 Tap Controller
286 Intensity Modulator Controller
288 Lens
290 Light refracted out of the waveguide toward the diffusing layer
292 The central point where light hits the diffusing layer
294 The diffusing layer

DETAILED DESCRIPTION OF THE INVENTION

1. Waveguide Displays—Sizes, Shapes and Types

Figure 2:
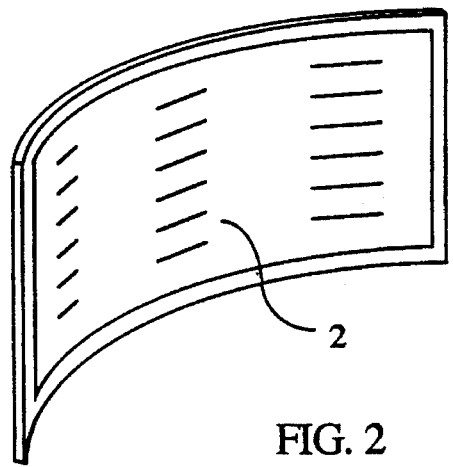
FIG. 2 is a perspective view of a curved display.
Figure 3:
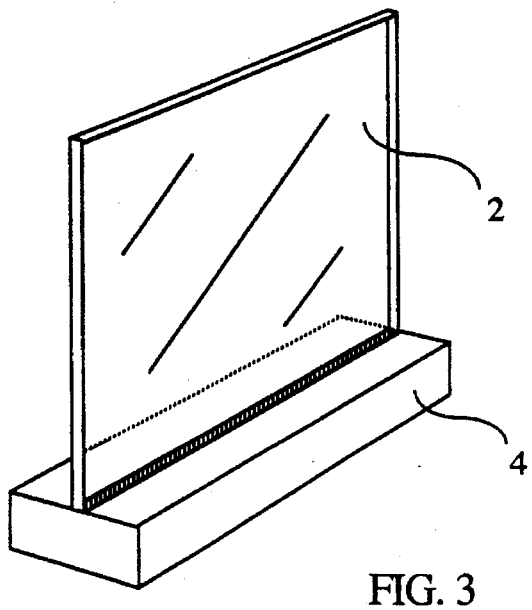
FIG. 3 is a perspective view of a semi-transparent flat display.

Turning now to the drawings, more particularly to FIGS. 1–3, which show three basic types of display that can be constructed using the optical waveguide methods introduced above. FIG. 1 is a perspective view of a flat panel screen 2 labeled along its height 61, thickness 60, and width 62 dimensions.

Optical waveguide displays 60 can be made very thin. Optical waveguides are capable of carrying extremely intense light, long distances, with little attenuation. This robust light carrying ability enables a single waveguide, 10–250 uM thick, to brightly illuminate hundreds of pixels (taps) oriented along its length. Consequently, because the light carrying ability of optical waveguides is so great, the panel thickness 60 can be made very small. Depending on the thickness of the substrate, waveguide panels with a thickness of 0.05–2 cm can be realized.

Optical waveguides may be constructed from a number of different materials. Commonly used waveguide materials include gases (air, nitrogen), liquids (water, carbon tetrachloride), plastics (acrylic, polyimide, polysterene) and glasses (crown, flint, silicon dioxide). Depending on the material, the waveguide losses may be made quite small. In advanced telecommunications waveguides, for example, the attenuation is less than 2 dB/Km. Consequently, waveguide/tap screens can incorporate very long optical waveguides before attenuation becomes a major design limitation.

Large viewing screens may be made using long, low-loss waveguides. Long fibers can individually be placed, sideby-side, on a separate substrate. Suitable substrates are presently also available in very large sizes. As a result, since the basic elements of the display, both the waveguides and the substrate, can separately be manufactured to large sizes, the screen itself can be made large. It is not unrealistic to expect viewing screens 3–5 meters on a side.

In fact, it is more of a challenge to make small screens. The resolution of a waveguide/tap display is constrained by the smallest screen pixel which can be displayed. The minimum pixel size is determined by the size and efficiency of the tap placed along the length of a waveguide. Presently, taps which are both efficient and have short interaction lengths are difficult to fabricate. The precise technical reasons for the limited efficiency and relatively long tap length will be made more clear in the next section.

FIG. 2 shows a curved display. Until now, thin displays have been limited to flat, planar, designs. The photolithographic techniques commonly used to produce matrices of electrodes in liquid crystal and electroluminescent panels necessitate flat exposure masks and substrates. This planar-based production equipment cannot be used with curved and other irregularly shaped substrates.

However, since waveguide/tap displays are based on optical waveguides, which are flexible, curved and other irregularly shaped screens can be created. For example, many fibers can be individually drawn, processed to create taps along their length, and separately placed over a curved substrate. Processing fiber to create taps first, and then placing the fibers over a substrate, eliminates the need for a flat substrate. Separate fiber and substrate processing steps allow irregularly shaped screens to be made without using traditional planar photolithographic processing steps.

Curved screens are potentially very useful. For example, if the optical fibers are long enough, a curved screen can be made which wraps 360 degrees around a viewer. Such a wrap-around display will greatly improve the cinemagraphic and video viewing experience. A viewer will have the impression of actually "being" in the center of a displayed picture.

FIG. 3 shows a semi-transparent panel. Transparent screens are possible since waveguides are, by nature, transparent. A viewer can look through the side of an optical waveguide, while light is flowing through the core, without seeing the guided light. As a result, with the appropriate configuration of clear waveguides and clear taps, semi-transparent panels could be made.

Semi-transparent displays will be useful in a number of novel applications. For example, store windows could be made to show messages and moving images, while at the same time allowing a customer to see what is going on inside the store. Also, artists might use such semi-transparent displays to make art exhibits.

2. Optical Waveguide Taps

FIGS. 4–9 show five different types of optical waveguide tap. As previously mentioned, the tap is the central component of a waveguide/tap display. Taps are responsible for directing light out from the waveguide core in such a way that it can be seen by the viewer. Ideally, display taps must switch quickly, consume little power, and be easy to fabricate. These tap properties can be realized using a different tap designs based on acousto-optic, electro-optic, thermo-optic and/or magneto-optic effects.

Figure 4:
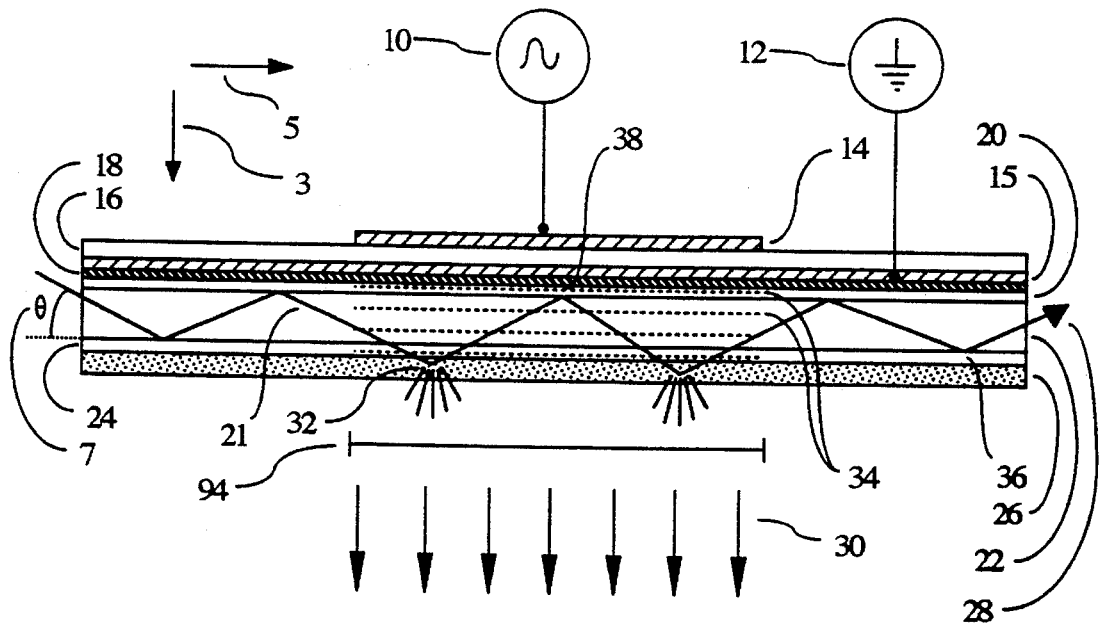
FIG. 4 is a cross section view of an optical waveguide and acousto-optic tap.

Turning now to FIG. 4, which shows a side-view of an acousto-optic waveguide tap, in which sound energy is employed to make light prematurely exit a waveguide core 22. When the tap is in operation, sound waves 34 propagate perpendicular 3 to the direction of light flow 5 in the waveguide. The changes in the index of refraction produced by sound passing through the cladding 20, 24 and core 22 layers causes light to couple out 32 and travel to the viewer 30.

Light must initially be traveling through the waveguide core 22 for it to be switched out in a tap region 94. For light to remain guided by total internal reflection in the waveguide, light must have an angle of propagation 7 less than the critical angle. The critical angle of light acceptance for a given waveguide is determined using Snell's law. It is calculated by knowing the index of refraction of the core 22 and cladding layers 22, 24. Light entering a waveguide at angles greater than the critical angle will not be guided by total internal reflection and will quickly dissipate due to propagation in high-loss cladding and radiant modes.

The sound source, typically a piezoelectric material 16 sandwiched between a ground conductor 15 and a signal conductor 14, is placed alongside the waveguide. The piezoelectric layer can be made of any suitable piezoelectric material including zinc oxide, barium titanate and polyvinylidene fluoride (PVDF). In operation, an alternating electric signal from a source 10 is connected to the signal conductor 14. The alternating electric signal, in turn, causes the piezoelectric layer to produce periodic acoustic waves. The periodic acoustic waves 34 travel into the cladding 20, 24 and core 22 where they cause changes in the index of refraction. Changes in the index of refraction induced by acoustic waves are ultimately responsible for making light prematurely exit the core 22. In the absence of acoustic energy 34 in the tap region 94, light will exit the waveguide at the end 28 with virtually the same intensity as when it entered 21.

Depending on the frequency and amplitude of the applied acoustic energy, and also on the precise construction of the optical waveguide, different mechanisms account for how the light exits from the waveguide. In ordinary commercial waveguides, periodic sound energy mostly produces refractive and diffractive effects. These diffractive and refractive effects modify the path a bound light ray takes when traveling through the waveguide core 22. The precise light ray path changes produced by sound induced diffractive and refractive effects in ordinary commercial waveguide depends on the frequency and amplitude of the applied acoustic energy.

If the applied acoustic frequency is low, less than approximately 100 MHz in glass, the path of a guided light ray will be altered due to diffraction in the Bragg regime. At higher acoustic frequencies light diffraction will occur in the Raman-Nath regime. Diffraction in both Bragg and Raman-Nath regimes can be used to tap light in an acousto-optic tap interaction region 94.

Ultimately, it is an increase in the angle of light propagation induced by acoustic perturbations which cause bound light to exit from the core 22. Changes in the angle of propagation convert guided light to both higher and lower order propagation modes. Guided light in a high order mode has a higher angle of light propagation than guided light in a low order mode. In the acousto-optic interaction region 94 mode conversion from a low order mode to a very high-order mode will cause light to exit from the core into the cladding 24. Once in the cladding 24, light exiting the core can be scattered and directed to the viewer 30. Thus mode conversion, or increasing the angle of propagation of the bound light, is one important mechanism for achieving core light removal in a waveguide tap.

The amount of light exiting at a tap from mode conversion can be quite large. An acoustic tap is particularly effective if the guided light traveling through the tap region 94 is weakly guided, or already in a high-order mode. If most of the light traveling through a waveguide is weakly guided, a slight acoustically induced mode conversion will cause it to escape into the cladding. Thus, the mode of the guided light is a key factor in determining the efficiency of a particular acoustic tap.

Light exiting from the core, once in the cladding, must be scattered before it can be viewed. In a tap region 94, light which has just entered the cladding 24 will tend to be oriented parallel 5 to the waveguide core 22. Thus, unless redirected, this tapped light will continue to travel through the cladding 24 and as a result will not be seen. In fact, light exiting the core may travel quite long distances through the cladding before it is scattered out to the viewer 30. Therefore, a scattering means is required for directing light out of the cladding and to the viewer.

There are several major ways of re-directing, or scattering, light out of the cladding 24 to the viewer 30. The first scattering technique employs a diffusing layer 26. The diffusing layer 26 is made of a base material whose index of refraction closely matches the cladding layer 24. Embedded in the base material are small particles, each with a different index of refraction than the base material. The difference in the index of refraction between the base material and the particles cause light to be re-directed. In other words, each particle in the base medium tends to act as a scattering center to diffuse light in the cladding. The combined effect of many small particles 26, or scattering centers, placed in close proximity cause light to be directed out of the diffusing layer and toward the viewer 30.

The second major scattering approach employs a transparent layer with lenses formed on it. The transparent layer, like the diffusing layer, is usually placed in contact with the outside cladding 24. Ideally, the transparent lens layer should have an index of refraction which closely matches the cladding 24. It is even possible to form lenses directly on the outside of an extra-thick cladding 24. Lenses serve to refract light traveling through the cladding away from the core 22 and toward the viewer 30. Lenses can be formed by etching irregularities directly onto the surface of a clear material. In fact, the irregularities need only be a random collection of microscopic bumps and pits to effectively refract and re-direct light. Thus, minute surface variations, essentially random in nature, are sufficient to scatter and redirect light. This is described in greater detail in the following section.

Preferably, light from the core 22 is so completely re-oriented, from either lenses or the diffusing layer, that it has a lambertian intensity profile. Light exiting the waveguide 30 in the interaction region 94 should appear to the viewer as a diffuse, planar, light source. Light tapped from the waveguide must be sufficiently dispersed to enable a viewer to see the tap from many different viewing angles.

There is an entirely different type of acousto-optic waveguide tap, based on effects other than refraction and diffraction, which may also be employed. This other tap method is uses evanescent field coupling effects. Evanescent field coupling takes advantage of the electromagnetic field of guided light which extends outside of the core and into the cladding. This field enables guided light to interact through a very thin cladding 24 with materials placed close to the waveguide core 22.

For example, if two waveguide cores are placed in close proximity guided light, via its associated evanescent field, will "tunnel" across from one waveguide core to the other. A coupler using this effect is commonly used in fiberoptic communication systems. Such evanescent couplers place two fiber optic waveguides in close proximity, approximately 1–5 um apart, to enable light to transfer from one fiber to the other fiber. 100% transfer of light between two waveguides can be obtained using this technique.

In specially designed optical waveguides, a very efficient tap based on the evanescent field effect can be built. For example, if the bottom cladding 24 is made sufficiently thin, light can be coupled out of the core and into the diffusing layer via its evanescent field. This light tapping method is extremely sensitive to the thickness and refractive index of the cladding 24 between the core and the diffusing layer 26. If the thickness and refractive index of-the cladding layer is carefully controlled, light will escape from the waveguide through the application of very small amounts of acoustic energy.

An interesting property of the evanescent tap is that it reduces the scattering requirements needed in the diffusing layer 26. The scattering requirements of the diffusing layer are reduced because light exiting from the core can be more directed toward the viewer 30. In particular, the angle of light coupled out from the core into the diffusing layer 26 can be made to be strongly angled in direction 3. This angling is made possible by making the index of refraction of the base diffusing material larger than the index of the refraction of the core. It is the higher index of refraction in the diffusing base material which causes light to be angled in direction 3. The more light is angled toward the viewer 30, the less scattering needs to be done in the diffusing layer 26.

Evanescent taps are also useful because they do not require periodic sound energy. Unlike Bragg and Raman-Nath diffraction taps, light can be coupled out of an evanescent tap simply by applying constant pressure to the interaction region 94. Thus, evanescent coupling taps can operate at much lower acoustic frequencies than diffraction-based taps.

In both the diffractive, refractive and evanescent tapping schemes, an important consideration is the distance light must travel in the interaction region 94 for a significant proportion of it to make it out of the core 22. The goal is to get as much light to couple out of the core 22 and scatter to the viewer 30 in as short an interaction region 94 as possible. The length of the interaction region 94 determines the minimum size of a pixel. The shorter the interaction length, the smaller pixel the display can use. Small pixels allow more information to be put on a viewing screen of a given size.

The interaction length 94 depends on the index of refraction and dimensions of the core 22, cladding 20, 24 and diffusing layer 26 materials, the amplitude and frequency of the acoustic energy, and the mode distribution of light propagating through the core. Since detailed analytic work has not yet been done, the exact length and efficiency of a particular tap can only be approximated. However, based on papers published by Manhar L. Shaw, G. B. Brandt and A. I. Gudzenko, it appears 50–70% of the light in the core can be coupled out in an interaction region 1–2 mm in length. Also based on their work, the power required to couple light out from a waveguide is estimated to be 10–100 mW/cm2. Future improvements should reduce the minimum interaction length and power requirements of acousto-optic taps.

The switching speed of an acousto-optic waveguide tap is extremely fast. The rate of response is determined by the transit time of an acoustic wave propagating perpendicular, in direction 3, through the waveguide cladding and core. Since longitudinal sound waves travel through glass at approximately 3000–5000 meters/second, and the typical waveguide is 10–100 um thick, the transit time of an acoustic wave through the waveguide core is approximately 3–30 nanoseconds. With such fast transit times, an acousto-optic tap can be expected to switch at 30–300 MHz. This switching speed is more than fast enough for use in a HDTV system. A waveguide/tap HDTV requires the fiber tap only to switch at 30,000 Hz.

Figure 5:
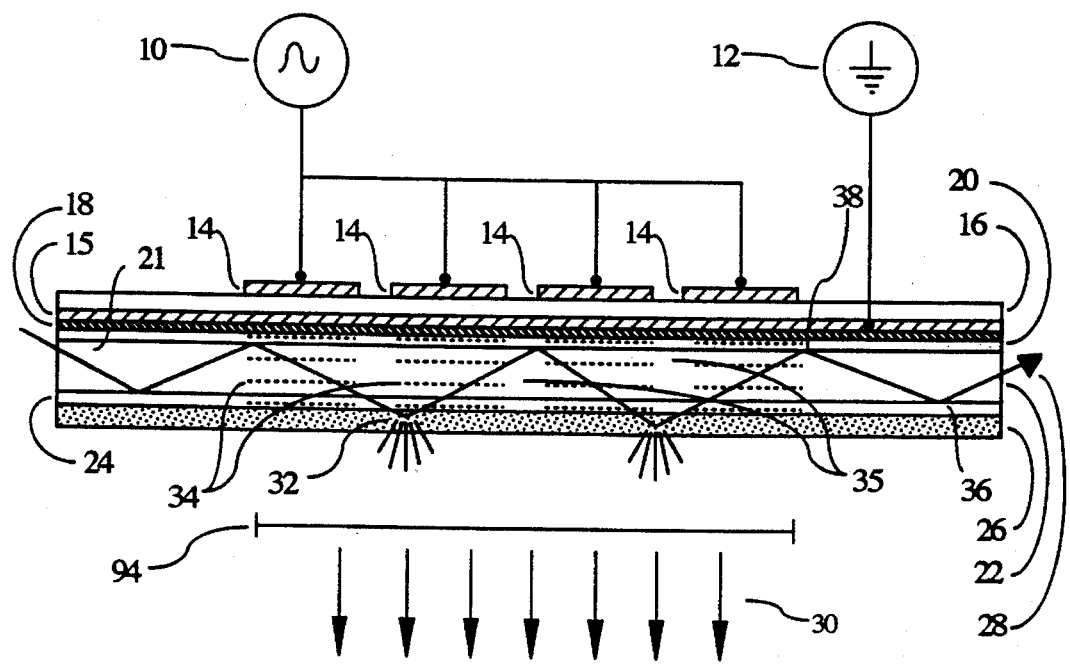
FIG. 5 is a cross section view of a waveguide and acousto-optic tap employing a series of closely spaced acoustic sources along a length of waveguide.

FIG. 5 shows an acoustic waveguide tap similar to the tap shown in FIG. 4.

However in this tap, mode conversion is effected by a series of small transducers 14 placed along a length of waveguide 22. Each signal conductor 14 in the interaction region 94 is connected to a source 10. The frequency of the source 10 can be adjusted so the acoustic wavelength generated by the piezoelectric material 16 is less than the length of the signal conductors 14. If the ratio between the (signal conductor length)/(acoustic wavelength)>1 the acoustic energy 34 from the piezoelectric layer will propagate downward 3 in relatively collimated beams.

Collimated acoustic beams, interspersed between inactive regions 35, cause irregular indexes of refraction in the core 22. The irregular core index of refraction facilitates the transfer of guided light into cladding and radiant modes. The irregular core 22 index or refraction produced by spacing a series transducers along a waveguide segment enable this tap to operate at relatively low acoustic frequencies. Low acoustic frequencies simplify the drive electronics 10 needed to control the piezoelectric layer 16.

It is important to comment on how different acoustic energy effects light traveling through an optical waveguide. Depending on the type of piezoelectric layer, either longitudinal or shear acoustic waves can be generated. Longitudinal and shear waves have different effects on guided light at different frequencies.

For example, at low frequencies longitudinal acoustic waves mostly cause phase changes in guided light. Shear waves typically cause mode conversion. Mode conversion is preferred to changing the phase because phase changes typically can not tap light from a waveguide core. However, at very high frequencies, such as 500–1000 MHz, diffractive effects caused by longitudinal waves can also cause mode conversion. Therefore, depending on the frequency, both longitudinal and shear acoustic energy may be used in an acousto-optic waveguide tap.

Figure 6:
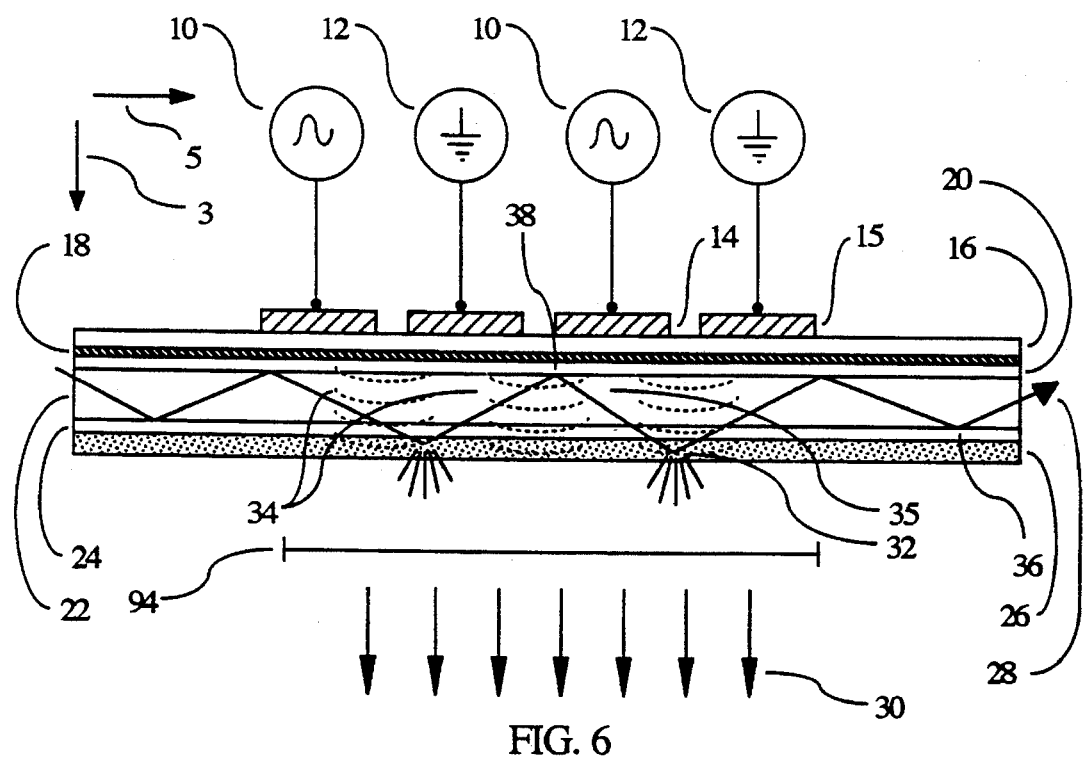
FIG. 6 is a cross section view of an interdigital acousto-optic waveguide tap with electrodes placed on the same side of a piezoelectric material.

FIG. 6 shows an interdigital tap which has the signal 14 and ground 15 conductors on the same side of the piezoelectric layer 16. Placing the signal 14 and ground 15 conductors on top, where they are accessible, is an important aspect of the invention. Since there is an opaque layer 18 positioned between the viewer and the tap electrodes, it is not possible to see beyond the diffusing 26, core 22 and cladding layers 24, 20. Thus, opaque wires and control electronics can be placed directly on the back of the screen without affecting the screen image.

The ability to place opaque electronics and control wires directly on the back of the waveguide simplifies the display manufacturing process. In particular, standard electronic components can be used instead of exotic and special purpose elements. For example, present matrix-electrode screens require transparent control electrodes. Transparent control electrodes are both expensive and prone to failure. In contrast, the acousto-optic tap electrodes can be formed with opaque conductors. Since many well characterized opaque conductors exist, the reliability of the tap manufacturing process can be increased.

Due to the arrangement of the interdigital electrodes in the tap shown in FIG. 6, a decay in the intensity of the electric fields between the signal 14 and ground 15 conductors causes the acoustic energy 34 produced in the piezoelectric layer 16 to have a complex shape. This acoustic energy, in spite of its irregular shape, is still able to couple light out of the core via the refractive, diffractive and evanescent mechanisms described above.

Figure 7:
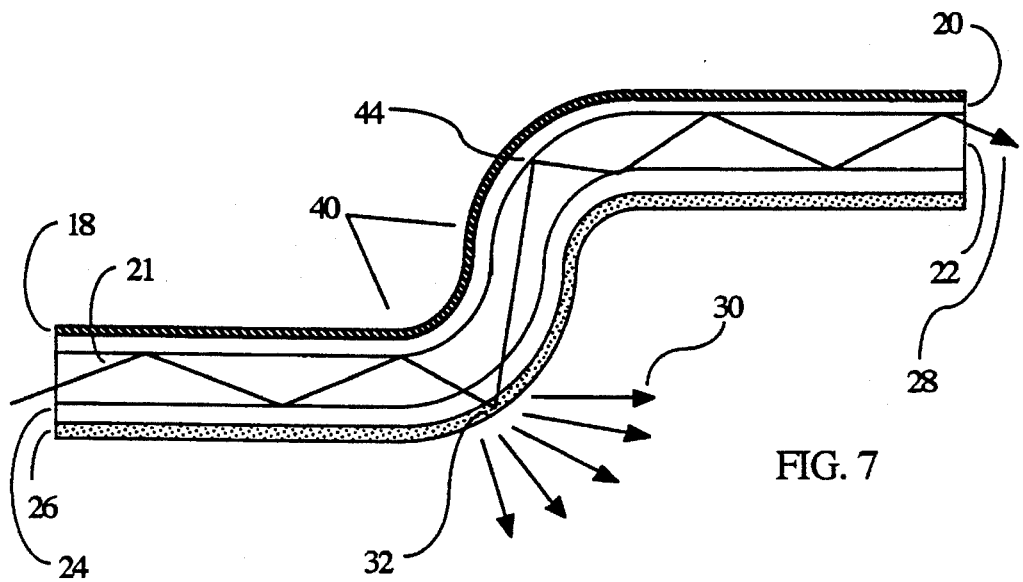
FIG. 7 is a cross section view of a waveguide leaking light due to micro-bending.

FIG. 7 shows how light can be tapped out from large scale bending of a waveguide. Bending, or microbending, causes light to escape by tunneling and refractive effects. If the bend radius 40 is made small relative to the waveguide thickness, these effects will cause a significant fraction of the light to escape into the cladding. Once in the cladding, light is scattered 32 by the diffusing layer and made visible 30. Microbending provides yet another powerful technique for mechanically tapping light out from a waveguide.

Different methods can be used to effect waveguide microbending. In one approach, bending can be caused in a localized waveguide region 40 with actuators. An actuator physically displaces the waveguide enough to bend 40 and couple light out 30. The use of waveguide actuators is presently impractical because mechanisms capable of sufficiently bending a waveguide are bulky. In addition, many actuators are needed to cover a screen; making the actuator approach prohibitively expensive.

A traveling acoustic wave can also be used to form a moving microbending region 40. To accomplish the microbending, a high intensity traveling acoustic wave is launched at one end of a waveguide and allowed to propagate down its length. The induced microbending region 40 moves as the traveling acoustic wave propagates down the length of the waveguide. The microbending caused in this region, in turn, allows light to escape 32 from the core 22 and become visible 30. Thus, a traveling acoustic wave can be used to automatically scan a length of waveguide. The traveling acoustic wave microbending method will be discussed in greater detail in the next section.

Figure 8:
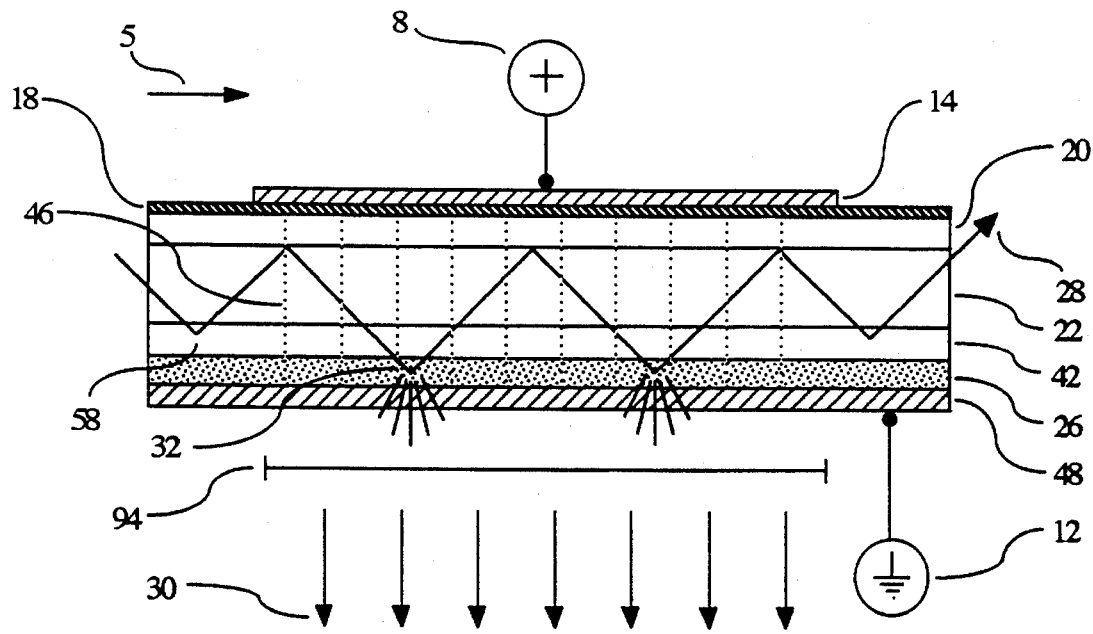
FIG. 8 is a cross section view of an electro-optic waveguide tap.

An entirely different type of waveguide modulator employing the electro-optic effect is shown in FIG. 8. Certain materials, in the presence of an electric field, directly change their index of refraction. Examples of electro-optic substances include $LiNbO_3$, $LiTaO_3$, $ZnO$ as well as doped polymers such as PMMA or special cross-linked polymers. While the change in the index of refraction caused by an electric field in such materials is extremely small, it is enough to make weakly guided light exit a waveguide.

In FIG. 8 light enters the core and propagates in direction 5 through the interaction region 94. The top cladding layer 20 is made of a low index, non-electro-optic material. The low-index top layer strongly guides light as it propagates through the interaction region. The bottom cladding layer 42 is made of an electro-optic material whose index of refraction can be changed by applying an electric field. The ground conductor 48 consists of a transparent electrode 48 deposited over the diffusing layer. When a voltage difference is applied between the bottom ground conductor 48 and the top control electrode 14, an electric field 46 causes the electro-optic cladding layer 42 to increases its index of refraction. If the light is already weakly guiding 52 an increase in the cladding index of refraction will cause it to penetrate into the diffusing layer 32. Once in the diffusing layer light scatters 32 and passes through the transparent ground conductor 48 to the observer 30. Evanescent effect couplers based on the electro-optic effect may also be built.

Figure 9:
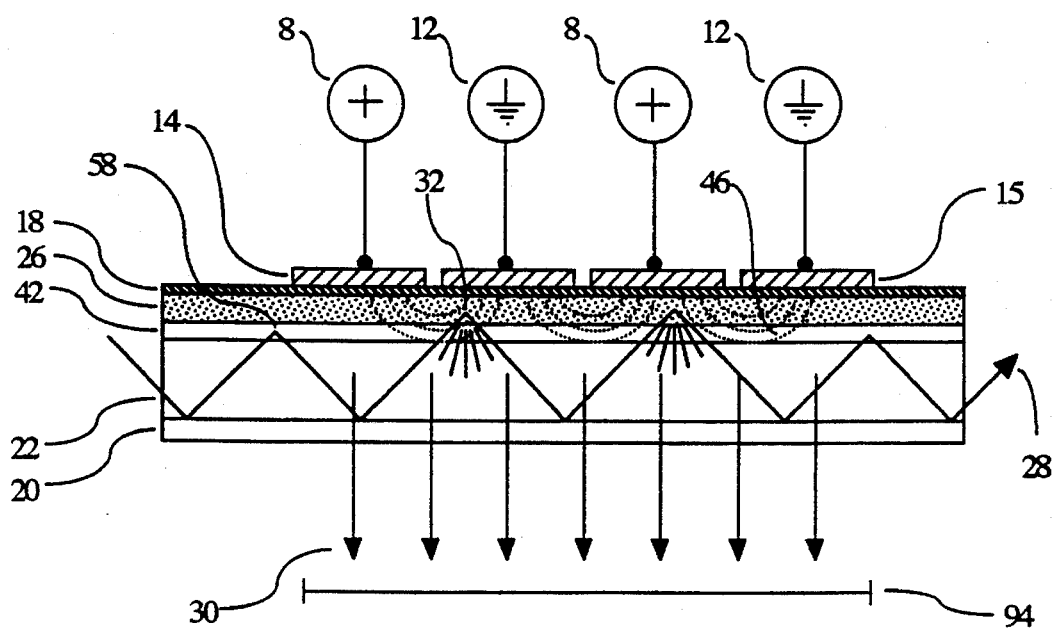
FIG. 9 is a cross section view of an interdigital electro-optic waveguide tap.

FIG. 9 shows an interdigital electro-optic waveguide modulator. The rationale for the interdigital electro-optic modulator is, again, to place all of the control electrodes on an exposed side of the waveguide to ease the manufacturing process. In practice, the interdigital electrodes cause an electric field 46 to penetrate through a non-electro-optic diffusing layer. The electric field causes the electro-optic cladding layer 42 to increase its index of refraction. Changes in the index of refraction cause light to penetrate up through the cladding into the diffusing layer 32 where it is scattered. Scattered light ultimately passes back through the waveguide core 22 and bottom cladding 20 layers and can be seen by a viewer.

To make the previously discussed waveguides work efficiently, many parameters must be properly adjusted. These parameters include the index of refraction, composition and thickness of the core 22, light diffusing layer 26 and cladding layers 20, 24. In particular, it is advantages to make the difference in the index of refraction between the core 22 and the top cladding layer 20 greater than the difference between the core 22 and bottom 24 cladding layer. If the top and bottom cladding layers have the same index of refraction, half the light will exit the waveguide in the interaction region 94 and be absorbed by the upper opaque absorption layer 18.

Absorption of light in opaque layer 18 decreases the efficiency of the display because absorbed light can not be scattered and seen by a viewer. Different indexes of refraction between the two cladding layers will cause the top cladding layer 20 to more strongly guide light than the bottom cladding layer 22. Thus, even in the tap region 94, light will not escape through the top cladding 20 and be absorbed by the opaque absorption layer 18.

3. Long Interaction Length Waveguide Taps

Turning now to FIGS. 10A–10C, which show side views of three different long interaction length waveguide taps based on the electro-optic effect. These taps may also use acousto-optic, thermo-optic and magneto-optic effects. It is strongly intended that long interaction length taps based on these effects be included within the scope of this discussion.

FIG. 10A shows light 28 traveling through a waveguide core 22. The tap is controlled by a voltage difference applied between conductors 15 and 18. The electric field induced by the voltage difference in the tap interaction region 94 causes an electro-optic material in the waveguide to change its index of refraction. Changes in the waveguide refractive index force light to exit the core and enter into the supercladding 176.

Light coupled into the supercladding must be redirected to the viewer before it can be observed. Light is typically deflected 166 by a pit formed in the supercladding. FIGS. 10A–10C show three angled deflector regions 166 formed in the supercladding. Light traveling through the supercladding hits a metalized 166 deflector and is reflected out 30 toward the viewer.

FIG. 10B shows light 30 being deflected out through the waveguide core 22 and cladding 172 layers. As in FIG. 10A, light is coupled out into the supercladding 176 in the interaction region 94. However, instead of being deflected 30 directly to the viewer, light in the supercladding 176 must first pass through the cladding 172 and core 22 layers.

FIG. 10C shows a hybrid combination of the taps shown in FIGS. 10A and 10B. Two supercladdings 176, one on either side of the core, carry light tapped out in the interaction region 94. By using two supercladdings the interaction length 94 needed to couple light out from a waveguide core 22 is decreased. Deflectors formed in the supercladdings 166 direct light to the viewer 30.

The preferred core-to-supercladding coupling mechanism is based on the evanescent transfer of light. Guided light can interact with materials placed near the cladding and core via its evanescent field. Evanescent field interactions allow very slight refractive index changes to switch large amounts of light out from the core.

The supercladding is preferably made of a material with a higher index of refraction than the core. A high supercladding index of refraction causes light coupled into the supercladding to be angled away from the core. Directing light away from the core decreases the depth the deflector must be etched into the supercladding. Consequently, it is easier to deflect light out 30 from the supercladding to the viewer.

Either the cladding, core, and/or supercladding may be made of electro-optic materials. In one embodiment, only the cladding 172 is made of an electro-optic material. A voltage difference 8 applied to the electrodes causes only the cladding to increase its index of refraction. Increasing the cladding refractive index forces guided light to interact with the supercladding 176. Light is coupled out from the core and travels through the supercladding until being re-directed 30 to the viewer at a deflector.

In a different tap embodiment, an electro-optic supercladding 176 can be made to act as part of a non-electro-optic cladding. In this configuration, the evanescent field of light in the waveguide core extends through the cladding into the supercladding. When the tap is "off", the supercladding has an index of refraction approximately equal to the cladding. In the "off" state, the supercladding and cladding collectively act to guide light through the waveguide. In other words, the cladding alone is not sufficient to confine light to the core.

However, when the tap is switched "on" the refractive index of the electro-optic supercladding increases. This refractive index increase couples light from the waveguide core into the supercladding. Light travels through the electro-optic supercladding until being deflected out 30 to a viewer.

Forming the supercladding out of an electro-optic material has the advantage that the core and cladding layers can be made from traditional non-electro-optic waveguide materials. Very low loss non-electro-optic materials have been developed which are capable of guiding light long distances, typically 100 meters or more, .with little attenuation. In contrast, electro-optic waveguide materials presently have optical losses in the range of 1 dB/cm. If the core and cladding were made of available electro-optic materials, attenuation of light in the waveguide would be prohibitively high.

To reduce loss, the waveguide is designed so only a small fraction of core guided light extends past the cladding into the electro-optic supercladding. Most of the light in the waveguide travels through the non-electro-optic core and cladding. Only the small fraction of guided light which actually extends into the electro-optic supercladding is more highly attenuated.

There are other ways to use electro-optic materials to tap light out of optical waveguides. Diffractive and/or refractive effects may also be used. For example, the core can be made of alternating layers of electro-optic and non-electro-optic materials. (Not Shown) In the absence of an electric field, the electro-optic and non-electro-optic materials are chosen to have the same index of refraction. However, when an electric field is applied to the waveguide, an increase in the index of refraction in the electro-optic core layers causes an irregular core refractive index. Bragg diffraction effects caused by an irregular core refractive index force light to exit into the supercladding.

It is possible that one supercladding deflector 166 will not be sufficient to deflect all of the light in the supercladding 176. It is important that the deflector remove all of the light in the supercladding, otherwise light will be deflected at the next supercladding deflector. Light leaking between supercladding deflectors distorts the screen image. To prevent light leakage, multiple supercladding deflectors (Not Shown) may be placed close to each each other. Closely spaced deflectors in a deflector region 176 will insure all of the supercladding light is removed.

Other means may be used to deflect light out of the supercladding. For example, a diffusing material containing small scattering centers may be placed in a deflector region 166. Light interacting with the scattering centers will be re-directed out of the supercladding. In general, anything which scatters, absorbs, reflects, refracts or blocks supercladding light can be used in a deflector region 166. Light deflecting means based on lenses, pigments, and dyes may also be used. In particular, a lens may be placed over the deflector pit to re-direct light after it has exited the supercladding.

It should be mentioned that long interaction length 94 taps are relatively tolerant to manufacturing variations. The performance of long interaction length taps degrades gracefully due to their long length. As a result, small irregularities in optical materials and the waveguide core and cladding dimensions have minimal effects on the performance of a tap. Tap interaction lengths 94 typically will vary from 0.01–20 cm in length.

In FIGS. 10A–10C the ground is 12 is connected to the bottom conductor 15 and the positive voltage 8, or signal, is connected to the top conductor 14. The connection of the ground 12 and voltage 8 to conductors 14 and 15 may be switched if desired. In fact, FIGS. 5 and 6 show layer 14 connected to ground 14 and layer 15 connected to the signal 8.

4. Staggered Taps on Multiple Waveguides

FIGS. 11A–11C show a schematic view of optical waveguide taps. The perspective in FIGS. 11A–11C is that of a viewer looking at the front of the display screen. If light were actually flowing direction 5 and emitted from the deflectors 166 shown in FIGS. 11B and 11C it would travel from the page toward the reader.

The small refractive index changes which can be achieved with acousto-optic, electro-optic and thermo-optic effects necessitate long tap interaction lengths. The total number of taps arranged along the the direction of light travel 5 determines the pixel resolution along one dimension of the display. Reducing the tap interaction length increases the screen resolution. FIG. 11A shows a single waveguide with many short interaction length 6 taps.

FIGS. 11B and 11C show how to use multiple waveguides to achieve high screen resolutions with long interaction length taps. FIG. 11B shows two waveguides 1 with half the width 158 of the single waveguide width 3 shown in FIG. 11A. The tap interaction length 94 on each waveguide is twice as long as on the single waveguide in FIG. 11A. By staggering the interaction 94 and deflector 166 regions on two separate waveguides the adjacent pixel spacing 162 is made equal to the short tap interaction length 164 single waveguide shown in FIG. 11A.

FIG. 11C shows how the tap interaction length increases when four waveguides are placed side-by-side. The interaction length 94 is twice as long as it is in FIG. 11B and four times as long as in FIG. 11A. Again, all of the light coupled out in the interaction region 94 is directed out of the waveguide at a deflector 166.

Many more than four parallel waveguides can be placed next to each other to achieve even longer interaction lengths 94. For example, if each deflector spacing 162 is 2 mm, each waveguide is 100 uM wide 158, and there are 20 waveguides in a column 160, the interaction 94 and deflector 166 length on each waveguide will be 40 mm. With these specifications each pixel is 2×2 mm and a 500×500 element display can fit on a 1×1 meter substrate.

Staggering taps on separate waveguides causes consecutive pixels oriented along the length of the waveguide to be horizontally displaced. This displacement results in adjacent picture elements having a "jagged" or "staircase" look. In addition, since the deflector size 166 gets smaller as more waveguides are placed next to each other, light emitted from the deflector comes from smaller and smaller size deflectors.

To smooth the jagged, point-like deflector appearance, lenses can be placed over the deflector pits to remove the staircase effect. These lenses will focus light from separate waveguides in a vertical column so it hits the same region on a diffusing layer. A diffusing material can be positioned between the viewer and the deflectors 10. (Not Shown)

A diffusing material scatters deflector light and makes a large light emitting area. Consequently, instead of a small point source, the diffusing layer causes deflector light to appear as a large area source. Deflector light traveling through the diffusing layer should exit with a lambertian intensity profile.

Light in the diffusing layer placed over a deflector should equal the width of all the parallel waveguides 156 in the column 160. For example, in FIGS. 11B and 11C light emitted from deflector 166 diffusing layer should equal the column width 160. The length of emitted diffusing layer light region should equal the adjacent deflector spacing 162 or 164. Deflector light in the diffusing layer can be isolated by molding, stamping or extruding plastic to cream separate scattering regions.

5. Intensity Modulator/Tap Waveguide Segments

Figure 12:
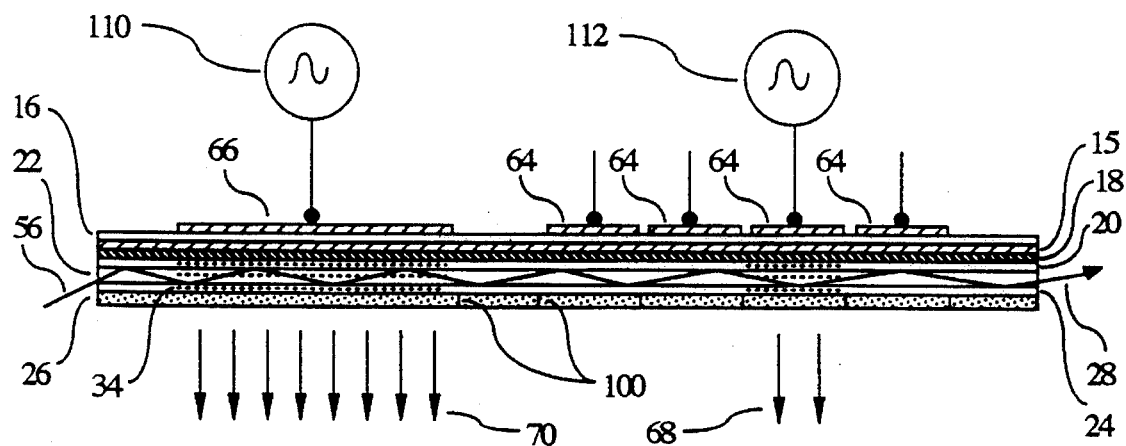
FIG. 12 is a cross section view of an acousto-optic intensity modulator followed by a series of acousto-optic taps to control the location and intensity of light emitted from a waveguide segment.
Figure 13:
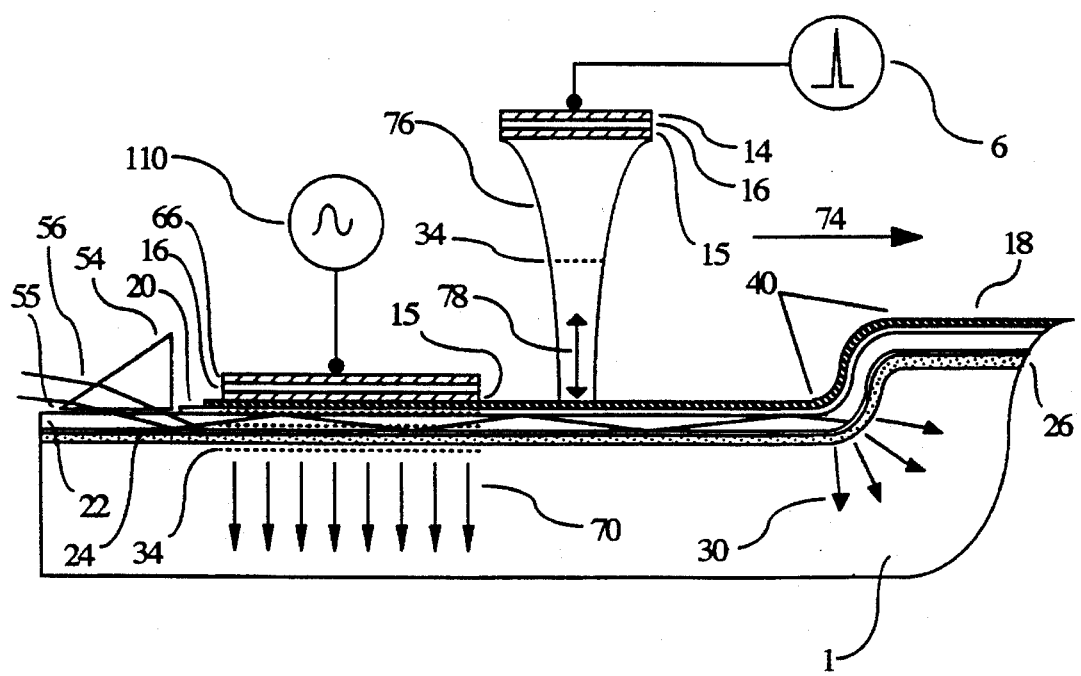
FIG. 13 is a cross section view of an acousto-optic intensity modulator and traveling acoustic wave which can be used to vary the intensity of light emitted from a length of waveguide.

FIGS. 12 and 13 show two different types of intensity modulator/tap waveguide segments. An intensity modulator/tap waveguide segment serves as a basic display building element. It enables the brightness of pixels oriented along the length of a waveguide to be conveniently controlled. Many modulator/tap waveguide segments, placed next to each other, are used to cover a two-dimensional viewing area.

FIG. 12 is a segment of waveguide incorporating acousto-optic intensity modulators and taps. This waveguide segment is divided into two parts: the intensity modulator—which controls the amount of light flowing through the waveguide; and the tap—which switches intensity modulated light out of the core to the viewer at different locations along the length of the waveguide. The brightness of a pixel is controlled by the intensity modulator and its visible location by a tap. This separation of the intensity modulator from the taps is important when trying to control the brightness of many pixels across a large two-dimensional surface.

In practice, light originating from a source 50 is focused 52 into the waveguide core 22. Once inside the core, light propagates with little loss until is forced out in an acousto-optic interaction region. If left undisturbed, bound light will exit at the end of the fiber 28.

The intensity of light traveling through the waveguide is first controlled by the intensity modulator 66. Light coupled out in the intensity modulator region 70 is typically blocked and is not intended to be directly viewed. The purpose of the intensity modulator is to regulate the amount of light reaching the taps 64 in a later section of the waveguide. Modulated light from the intensity modulator 66 continues through the waveguide until it reaches a tap 64 connected to a signal source 112. The acoustic energy at an active tap 34 forces the remaining light to exit and become visible 68.

The opaque light blocks 100 imbedded in the diffusing layer separate pixels placed along the length of a waveguide. Light coupled out of the core 22 will typically scatter in many different directions. The scattered light will cause pixels to be poorly defined and make the screen image look fuzzy. To correct this problem and sharply define a pixel, light barriers are formed by masking and etching the diffusing layer 26. Groves formed from the etching process are filled with an optically opaque material. Light blocks 100 keep light strictly confined to the pixel interaction region.

FIG. 13 is an alternative form of waveguide intensity modulator/tap. Instead of taps 64, this technique utilizes a traveling acoustic wave 74 to cause a micro-bending region 40. Light traveling in the waveguide through the microbending region 40 is coupled out and made visible 30 by refractive and tunneling effects. As the traveling, acoustic wave-induced microbending region moves, the light intensity in the waveguide can be adjusted by the intensity modulator 66.

Using a traveling acoustic wave to produce a moving microbending region eliminates either the row or column address lines common to most flat panel displays. Since the acoustic wave automatically travels away from the source 76, it can be used to scan the length of a waveguide. Using a traveling acoustic wave to automatically scan the length of a waveguide eliminates either the row or column address lines. Eliminating the address lines allows semi-transparent screens, like the one shown in FIG. 3, to be produced, since tap electrodes are not needed over the screen display area.

FIG. 13 details how the traveling acoustic wave system works. Initially, light from a light source 56 is launched into the waveguide core 22 with a prism coupler 54. The prism coupler transfers light into the core 22 using an evanescent field across an air gap. This light transfer method is similar to the evanescent field waveguide couplers discussed above. A related waveguide light coupling method might employ diffraction gratings.

Once bound in the waveguide, the intensity of the guided light is controlled by an intensity modulator 66. The intensity modulator 66 is similar to the acousto-optic tap shown in FIG. 4. Acoustic energy 34 from a piezoelectric layer 16 passes through the waveguide cladding 20, 24 and core 22. Light coupled out from the acousto-optic interaction 70 regulates the amount of light traveling through the remainder of the core 22. Intensity modulated light is ultimately tapped out to the viewer 30 in the traveling microbending region 40.

To create the microbending region 40, a pulse from a signal source 6 is required. The pulse causes a high intensity acoustic wave 34 to propagate through a tapered horn 76. The horn magnifies the amplitude of the sound from the acoustic source. The interaction of the horn 78 with the waveguide causes a traveling wave to propagate away in direction 74. As the traveling wave moves, light from the traveling wave bend region 40 is scattered and made visible 30. In addition, as the traveling wave propagates, the intensity modulator 70 controls the quantity of light exiting the waveguide at the microbend region. Thus, the light intensity along a one-dimensional length of waveguide can be regulated.

6. Thin-Film Waveguide Display Systems

Figure 14:
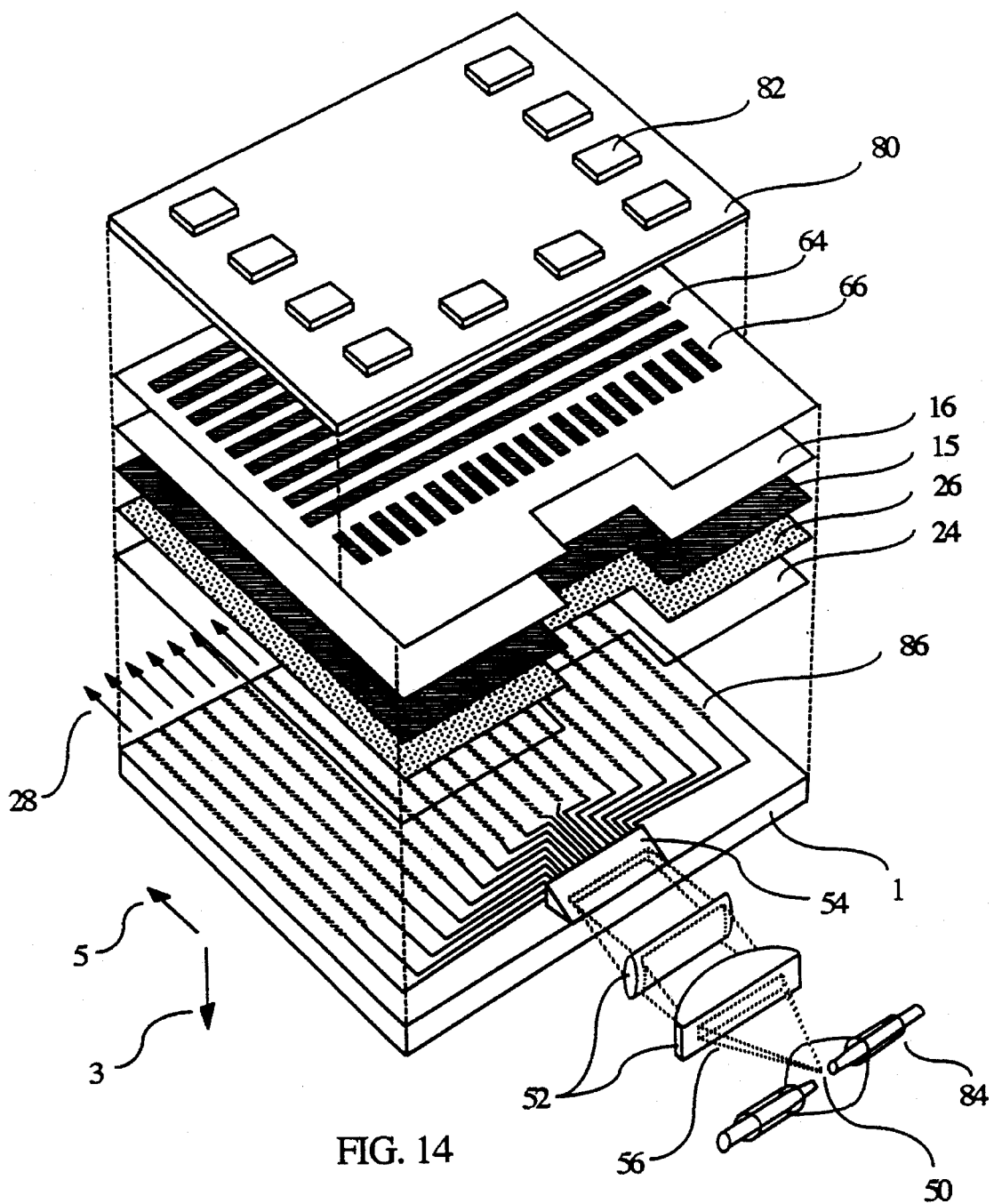
FIG. 14 is an exploded perspective view of a complete display comprising waveguides deposited on a substrate, acousto-optic intensity modulators and taps.
Figure 15:
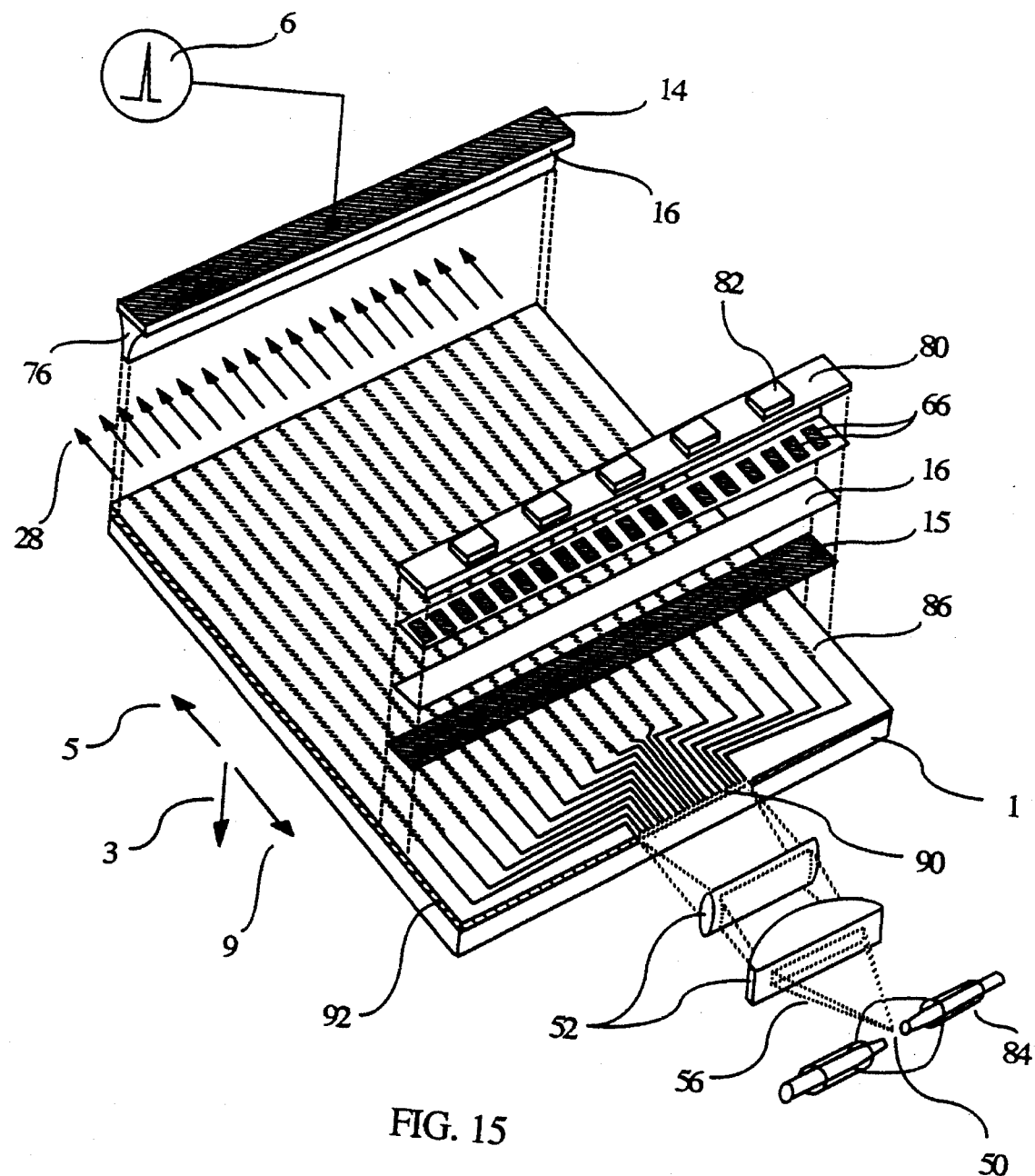
FIG. 15 is an exploded perspective view of a complete display using acoustic intensity modulators and a traveling acoustic wave.

FIGS. 14 and 15 show two methods for combining intensity modulator/tap waveguide segments into a complete display system. FIG. 14 shows an exploded perspective view of a display utilizing thin-film waveguides. In this system, light is guided by thin-film waveguides 86 deposited on a substrate 1.

The thin-film waveguide core 86 material can be deposited on the substrate using traditional sputtering, plasma polymerization, spinning and dipping techniques. Waveguide cores 86 can also be formed in the substrate itself using ion migration, proton bombardment and ion implantation. Either way, a high index region is applied to form the waveguide core elements.

Light is coupled into the waveguides from a point light source 50. Preferred light sources include xenon arc and quartz halogen lamps. Light from the source 56 is focused and shaped with lenses 52 into the waveguides using an evanescent field prism coupler 54. Once coupled into the waveguides from this prism, light travels in direction 5 until it exits the ends of the waveguides 28.

A top cladding layer 24 is placed over the waveguides. The top cladding layer 24 acts as an optical insulator to separate the core from the diffusing layer 26. A conductive bottom ground layer 15 is placed over the diffusing layer 26. A piezoelectric layer 16 is placed over the ground layer 15. On the top, the row electrodes 66 modulate the intensity of light in each of the waveguides. The tap electrodes 64 couple intensity modulated light out and make it visible.

The system is controlled by integrated circuits 82 placed on the two-sided printed circuit board 80. Conductors on the bottom side of the printed circuit board 80 feed through and contact the modulator 66 and tap electrodes 64. The electronics on the printed circuit board control the amount of light exiting the waveguide in direction 3 by controlling the intensity modulators. Proper regulation of the intensity modulators and taps allow still and moving images to be formed.

FIG. 15 shows a display based on a traveling acoustic wave-induced bending region. In this design, the traveling acoustic wave induces a bending region which propagates across the substrate. The bending caused by the traveling acoustic wave lets light out so it is visible. In FIG. 15, light from a point source 50 is used to feed the display. Light is focused 52 and end-coupled directly into the waveguide cores. The waveguides 86 are thin-film and integrated 92 with a light diffusing layer 15 onto a substrate 1. The precise layering of the optical thin-films, diffusing layer and piezoelectric layer is similar to the intensity modulator/tap segment shown in FIG. 14.

In operation, a traveling acoustic wave generated from the sound amplification horn 76 moves across the substrate 9. As the wave propagates, light exits 3 out to the viewer. The intensity of light in each of the waveguides is regulated by the intensity modulators 66. Acoustic energy generated by the piezoelectric layer 16 passes through the ground layer 15 into the waveguides 86 and controls the amount of light in each core. In this way, as the acoustically induced bend region scans across the substrate, the intensity of light in each of the waveguides is adjusted to create a complete image.

7. Waveguide Ribbon

Thin-film optical waveguides deposited on a substrate by sputtering, spinning and dipping techniques have a high light attenuation rate. The best transmittance achieved to date reduces light at a rate of 0.01 dB/cm. For example, a thin film waveguide 100 cm long will lose 1/5 of its light.

Another problem with thin-film waveguides is the expensive coupling techniques required to direct light from a light source into a collection of thin-film waveguides deposited on a substrate. Both the prism and end-alignment couplers require precision optical components. These precision components are expensive and their use adds considerably to the price of the total display. Consequently, without further improvements, thin-film technology is probably inadequate for use in large waveguide-based display systems.

To address these light attenuation and coupling problems, optical waveguides formed by fiber-optic drawing techniques can be employed instead. Optical fiber is made by heating and softening bulk optical material, i.e.—the preform, in a furnace. For example, silicon dioxide rods 1 inch in diameter can be stretched into a fiber 50 um in diameter with an attenuation less than 2 dB/Km.

Many single fibers can be placed across a substrate to create waveguide viewing screens. However, positioning single fibers across a substrate, side-by-side, is a laborious and expensive way to form a parallel system of waveguides. In an effort to make waveguides easier to arrange on the substrate, a ribbon 130 containing multiple waveguides is introduced in FIG. 14. This ribbon integrates waveguides and modulators into a single unit t0 guide light across the display screen.

Figure 16:
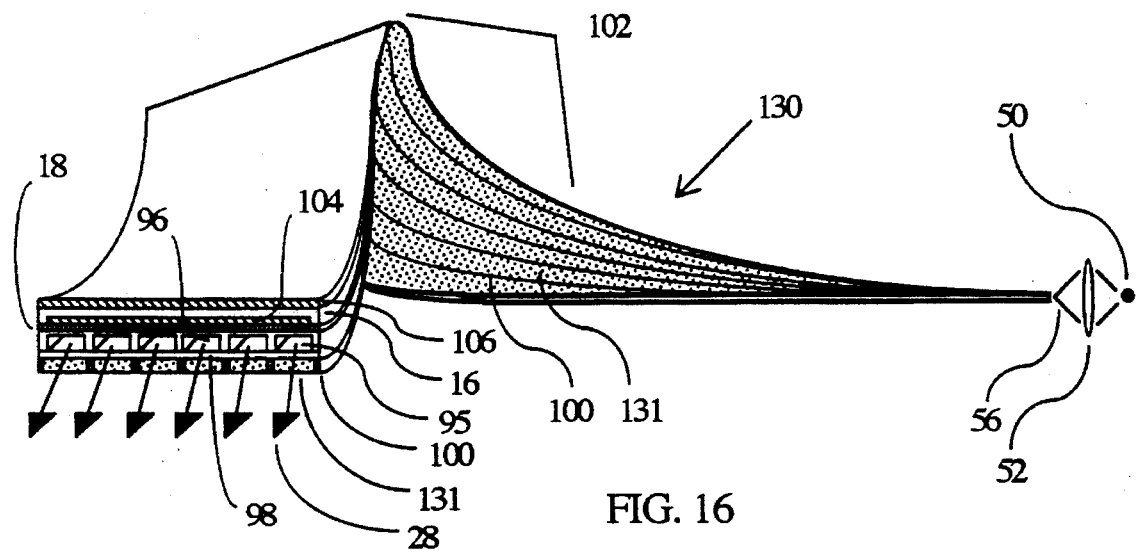
FIG. 16 is a perspective view of an optical waveguide ribbon made up of many individual waveguide elements.

In FIG. 16, light from a point source 50 is focused 52 into the ribbon cores 95. Once bound in the cores 95, light propagates in parallel through each core element 95 until it exits the the other end of the ribbon at 28. In the middle of the diagram the ribbon segment twists 102 and changes direction 90 degrees. In the twist region 102 the ribbon bends and folds over itself, re-orienting the direction of light contained in the waveguide cores to the viewer 28.

Waveguide ribbon has a number of advantages over thin film and individually drawn fiber. First its size and mechanical flexibility allow it to be conveniently placed over a wide variety of differently shaped substrates. Possible shapes include the curved and 360-degree wrap-around screens mentioned earlier in the application.

Second, since the essential intensity modulator/tap components can be integrated onto the ribbon, the substrate may be made of virtually any clear material. In contrast to thin-film waveguides, which require expensive defect-free substrates, ribbon may be placed on a wide variety of different low-cost substrates. Reducing the cost of the substrate is very important as the size of the screen increases. In very large, wall-sized displays, the substrate makes up a significant fraction of the total display price. By economizing on the types of substrate that can be used, the cost of the entire panel can be lowered.

The third advantage to using waveguide ribbon is the possibility of automating the manufacturing process. Optical ribbon can integrate waveguides, modulators and taps into a long, continuous, single-piece unit. Since these elements are at the heart of the display, producing the ribbon is a major portion of the display manufacturing process. In fact, once the ribbon has been fabricated, it is only necessary to lay ribbon segments on a substrate, next to each other, to form a viewing screen. The process of placing ribbon segments together is not unlike arranging wall paper to cover a wall. Each ribbon segment is aligned next to other ribbons to cover the complete viewing screen.

Producing waveguide ribbon with traditional furnace/drawing techniques allows the ribbon manufacturing process to be automated. In practice, a block of bulk optical material containing parallel Cores is placed in a furnace where it is heated, softened and s/retched out. Stretching the softened optical material causes it to become thin and elongated. The dimensions of the resulting ribbon should be in the range of 50–500 um thick and 10–100 mm wide. Ribbon with these dimensions will be flexible, so it can be wrapped and twisted as shown in FIG. 14. Flexible waveguide ribbon can be rolled onto spools for storage before applying the metal and piezoelectric layers.

Machines capable of depositing metal and piezoelectric materials onto optical ribbon are straightforward to built. Long lengths of waveguide ribbon rolled onto spools and placed in such machines will automatically be deposited with metal and piezoelectric layers, then etched to create tap and intensity modulator electrodes. Processing ribbons by rolling them onto spools is considered to be an important manufacturing technique introduced by this invention.

The fourth advantage to using ribbon is in controlling the angle of light entering the ribbon cores. Controlling the propagation mode of light in a waveguide core is essential to realizing the optimal efficiency of the display modulators and taps. Light in a high order mode is typically weakly guiding and therefore easier to make exit the waveguide at an intensity modulator or tap. Since the spacing of the cores in optical ribbon can be made very regular, the launch angle of light entering the ribbon cores may be precisely controlled. The preferred light coupling method will be shown in the next section.

Figure 17:
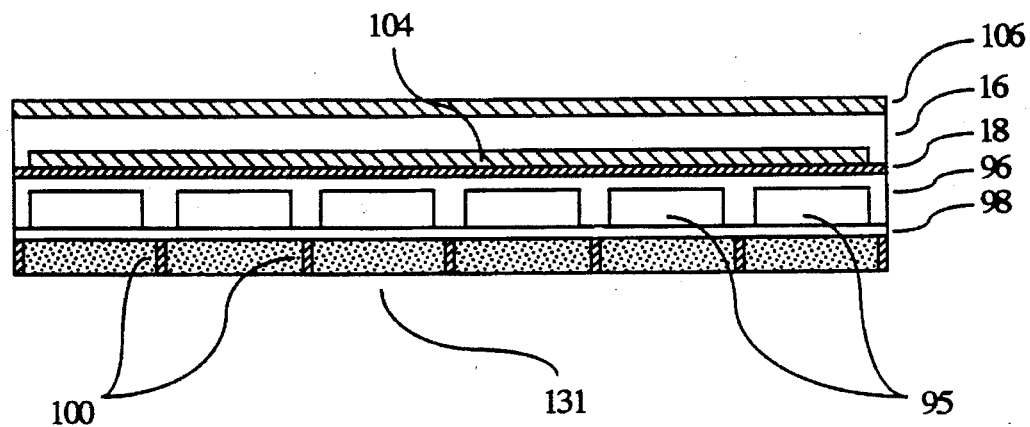
FIG. 17 is an enlarged cross section view of the waveguide ribbon shown in FIG. 16.

FIG. 17 shows an enlarged cross-section slice of a waveguide ribbon. The ribbon is composed of a plurality of cores 95 surrounded by low-index cladding material 96, 98. Acoustic energy from the piezoelectric layer 16 propagates through the bottom ground conductor 104 and into the core and cladding layers. The top electrode 106 connects to an electric signal source which controls the intensity of the generated acoustic energy.

A light diffusing layer 131 is placed in contact with the bottom cladding layer 98 to scatter light from the cores in many different directions. Imbedded in the diffusing layer are light blocks 100. The light blocks act to separate light coupled from each individual waveguide element in the ribbon.

The opaque layer 18 absorbs ambient and scattered light which is directed backward into the ribbon. The opaque layer 18 increases the contrast ratio of the display by making the screen appear darker when light is not tapped out of the waveguides. A dark background also enables the screen pixels to show a greater range of different shades. The absorption layer 18 can be made of materials such as black glass, plastics, or a pigment applied directly to the top cladding layer.

Figure 18:
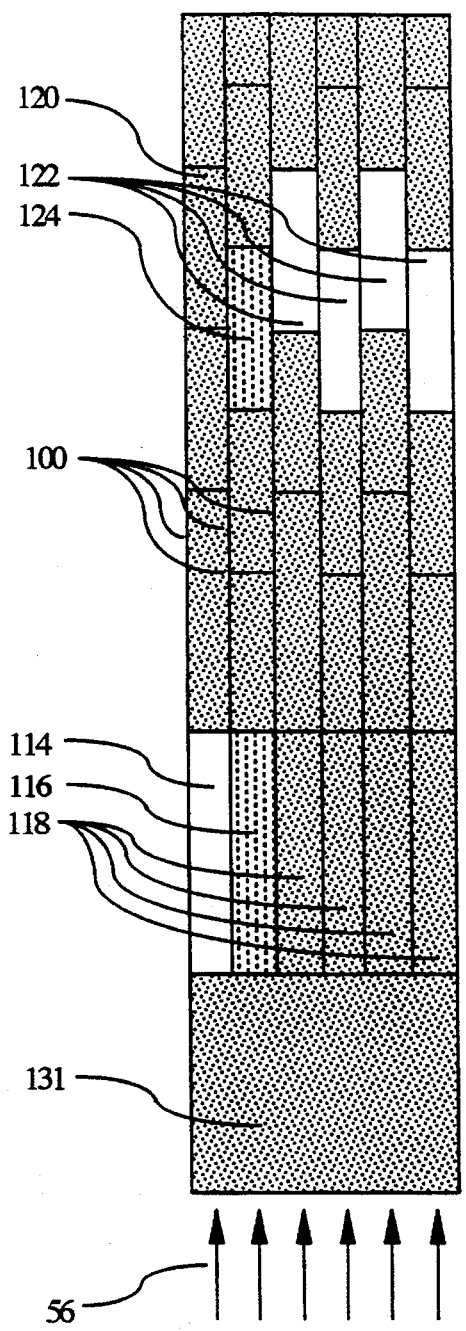
FIG. 18 is a front view of the light emitting side of the waveguide ribbon shown in FIG. 16.
Figure 19:
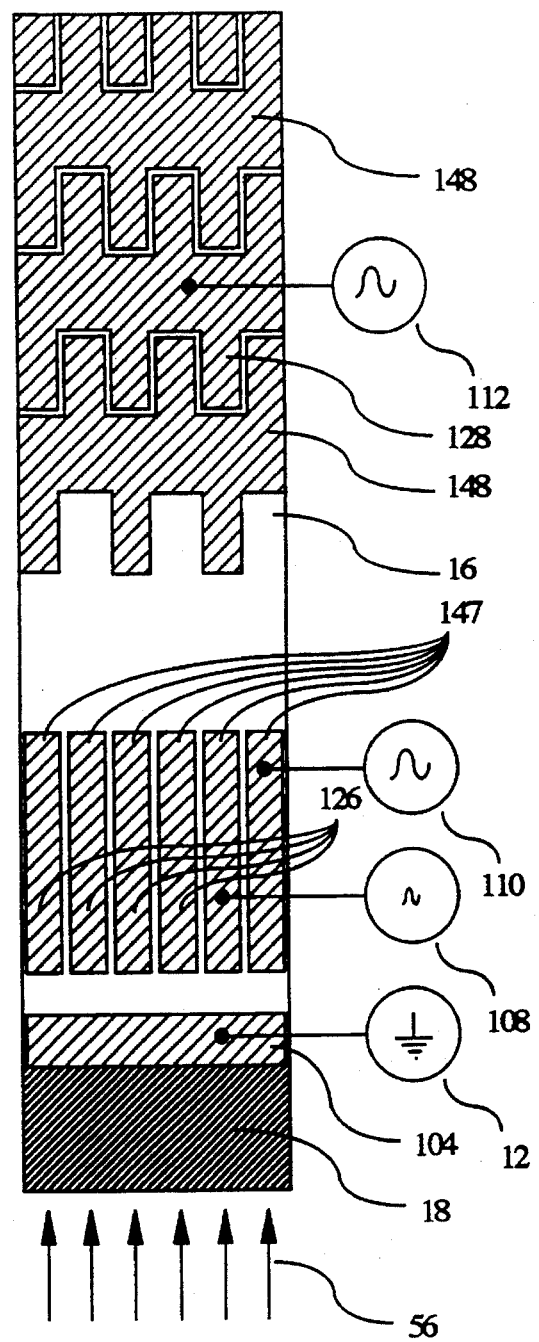
FIG. 19 is a back view of the waveguide ribbon shown in FIG. 18.

FIGS. 18 and 19 show front and back views of the waveguide ribbon. The front view in FIG. 18 is the light emitting side of the ribbon. Light scattered from the diffusing layer 131 on this side makes its way to the viewer. FIG. 17 is the back of the corresponding piece of ribbon. The back shows the control electrodes which modulate the intensity and tap light out at different positions along the length of the waveguide.

Light 56 enters the waveguide cores at the bottom of the diagram. The ribbons in FIGS. 18 and 19 each have six waveguide cores spaced in parallel next to each other. Optical insulators 100 embedded in the diffusing layer, increase the definition of the pixels. The light intensity in the waveguide cores is first controlled by the intensity modulators 147. The intensity modulators regulate the brightness of light in the waveguides before it is tapped out and displayed. Light modulated out of the intensity modulators exits the ribbons in regions 114, 116 and 118.

The remaining light travels through each of the ribbon cores until it exits at the taps controlled by electrodes 128 and 148. Taps direct all of the remaining light in the waveguides out to the viewer. Depending on which tap is active, light from electrodes 128 and 148 will leave the waveguide and be viewed at different locations. For example, if tap 128 is active, light will exit the ribbon in regions 120, 122 and 124.

The amount of light observed at an active tap is determined by the intensity modulators 147 associated with the waveguide supplying light to that tap. For example, intensity modulators 126 are not active. As a result, no light is emitted from the visible side of the waveguide 118. However, since no light has been made to escape intensity modulator 126, bound light continues through the waveguides and exits at the tap location 122. In other words, when the modulator segments 118 are dark, the corresponding tap areas 122 are bright.

Light made to exit the waveguide at the intensity modulator region 147 reduces the quantity of light available which can exit the tap. For example, signal source 110 provides a large signal to one tap. The light emitted from this intensity modulator is intense 114. As consequence, there is little light left in the core to exit the waveguide at its corresponding tap point 120. Intermediate amounts of light can also be displayed as shown by modulator 116 and tap 124. Applying a medium-sized modulation signal 108 to the intensity modulator reduces the amount of light which can be viewed at the tap location 124 controlled by signal 112.

8. Long Interaction Length Optical Waveguide Ribbon

Figure 20A:
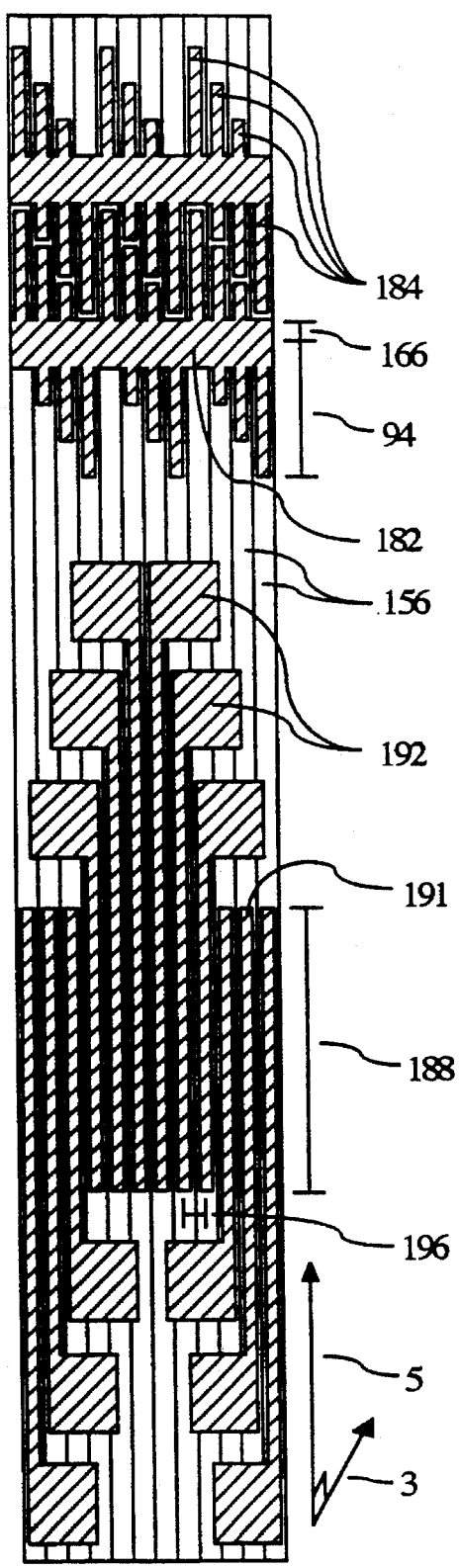
FIG. 20A is the back view of a waveguide ribbon which contains intensity modulators and taps.
Figure 20B:
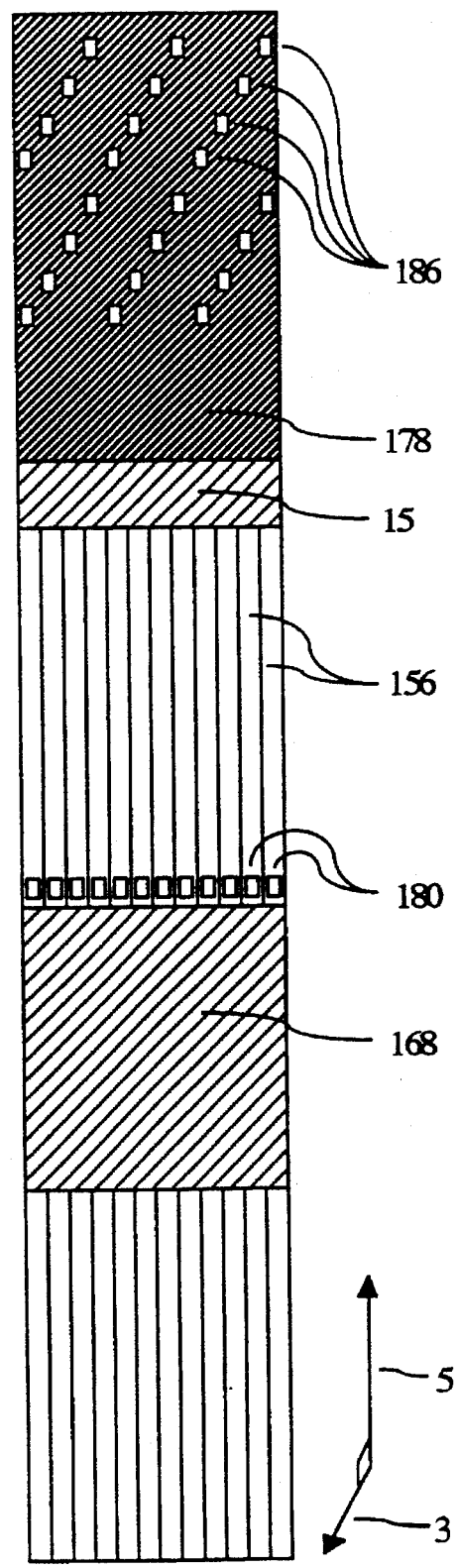
FIG. 20B is the front view of the same ribbon in FIG. 5 showing the ground conductors and deflectors where light is directed out from the waveguides to the viewer.

FIGS. 20A–20B show the front and back of a segment of optical waveguide ribbon. In FIGS. 20A and 20B a plurality of optical waveguides 156 carry light direction 5. Light is first tapped out by intensity modulators 191 which have an interaction length 188 sufficiently long to remove all of the light traveling through the ribbon cores. Intensity modulator light is directed out at deflectors 180. Light exiting the supercladding at deflectors 180 is not intended to be directly viewed. The major function of the deflectors 180 is to remove intensity modulator light from the supercladding.

The taps 182 contain a series of staggered fingers 184, each with a length 94. As shown in FIGS. 11B and 11C, a high pixel resolution is achieved by staggering many long interaction length taps side-by-side next to each other. Light is deflected out of the deflectors 180 and travels to the viewer. Deflectors 180 are formed in a dark material 178 to increase the screen contrast ratio.

A tap ground conductor 15 runs vertically along the entire tap region of the ribbon. The intensity modulator ground conductor 168 is only as long as the interaction length 188 of the intensity modulators. The taps and intensity modulators are controlled by an electric field (Not Shown) which extends through the ribbon between the control 191 and 182 and ground 15 and 168 electrodes.

It is important to note the arrangement of the intensity modulator bonding pads 192. Drive electronics must be attached to thousands of individual intensity modulators in order to form screen images. However, the spacing between the intensity modulators electrodes is very small. Intensity modulators are typically spaced 20–200 uM apart. (To prevent arcing, an insulator may be placed over intensity modulator and tap electrodes.)

When ribbons are placed next to each other, the cumulative spacing error 196 between intensity modulators placed on separate ribbons may become quite large. These ribbon spacing errors make the connection of control electronics more difficult to accomplish. Ideally, the screen drive electronics (Not Shown) are put on a single PC (printed circuit) board which is placed over all the intensity modulators on all the ribbons. Electrodes on the bottom of the PC board contact the intensity modulator electrodes in a one-to-one correspondence.

However, if all the drive electronics are put on a single PC board, and side-by-side ribbon spacing errors are large and unpredictable, a mismatch between the PC board and intensity modulator electrodes will occur. Large bonding pads 42 minimize drive electronic connection problems by reducing intensity modulator attachment tolerances. Thus, a single PC board can be placed in contact with many intensity modulators on multiple ribbons.

8. Electro-Optic Waveguide Ribbon

Figure 21A:
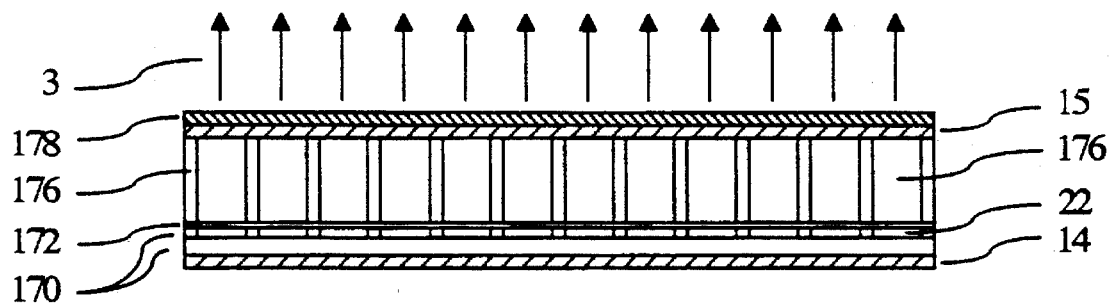
FIG. 21A is a profile view of a ribbon containing multiple supercladding elements arranged on one side of multiple cores elements.

FIGS. 21A–21B and 22A–22B show cross sections of four different types of electro-optic optical waveguide ribbon. FIG. 21A, shows multiple ribbon waveguide cores 28 surrounded by cladding 22. A thin cladding layer 24 is positioned between the core 28 and the supercladding 26. The core is typically 1–200 uM thick. Light is coupled out of the cores 28 through the thin cladding 24 into the supercladding 26. As previously mentioned, the light coupling method may use evanescent field coupling, diffractive and/or refractive effects.

A light absorbing material 34 is placed on one side of the ribbon to increase the screen contrast ratio. The light absorbing material can be placed on either side of the ribbon depending on how the deflectors 10 are formed in the supercladding. For example, if the deflector is similar to the one shown in FIG. 1A, the light absorbing material 34 is placed on the top. If the tap is similar to the one shown in FIG. 1B, the absorbing layer 34 is placed on the bottom.

Figure 21B:
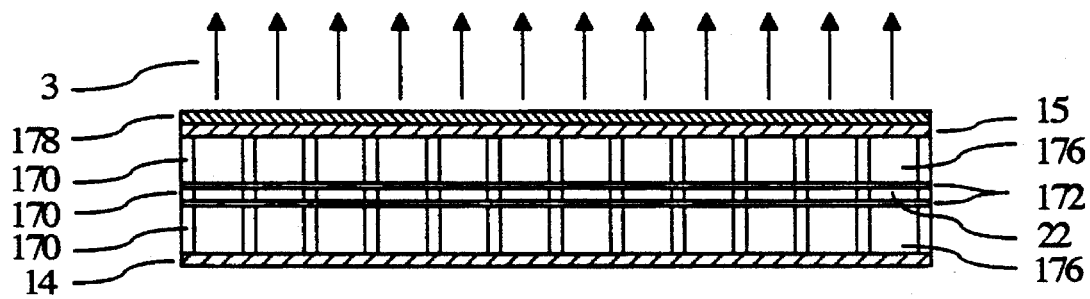
FIG. 21B is a profile view of a ribbon containing multiple supercladding elements arranged on both sides of multiple core elements.

FIG. 21B is essentially the same as the ribbon in FIG. 21A, except for another supercladding 26 layer placed alongside the core elements 28. A thin cladding 24 and supercladding 26 is placed on each side of the core elements. The use of two supercladdings 26 reduces the tap interaction length 8 since guided light in the core 28 interacts more strongly with both supercladdings 26. Dual deflectors like those shown in FIG. 10C are formed in both supercladdings 26 to direct supercladding light out to the viewer.

Figure 22A:
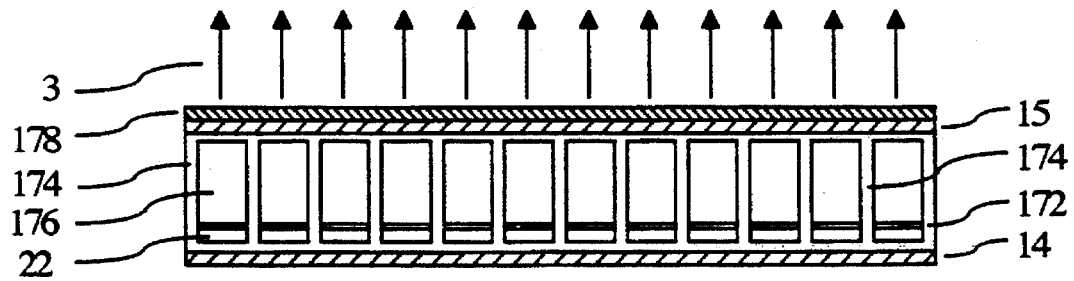
FIG. 22A is a profile view of a ribbon containing multiple supercladding elements arranged on one side of the multiple core elements where the cores, cladding and supercladding elements are isolated from each other.
Figure 22B:
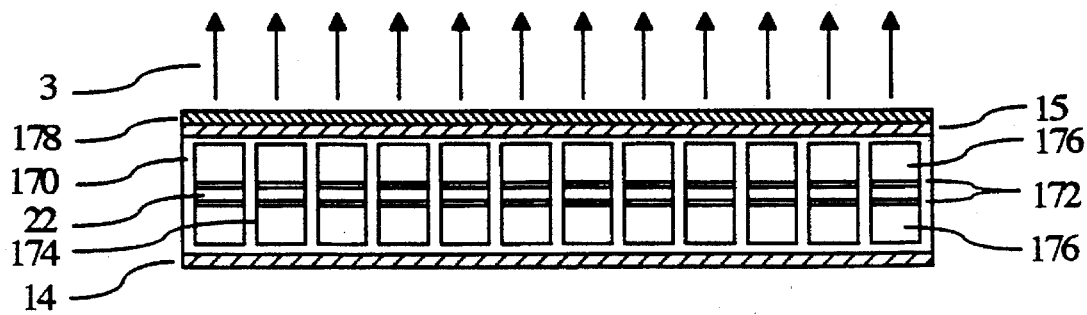
FIG. 22B is a profile view of a ribbon containing multiple supercladding elements arranged on both sides of the ribbon cores where the cores, cladding and supercladding elements are isolated from each other.

FIGS. 22A and 22B show waveguides supercladding 26, cladding 24 and core 28 elements which are separated from each other. Optical separation is achieved by interspacing a cladding material 25 between the individual waveguide elements 26, 24 and 28. In addition, optically separating 25 the supercladding 26 from the metal conductor 20 reduces attenuation of guided supercladding light.

Finally, in operation an electric field extends between the top 20 and bottom 18 conductors. In order for light to be removed from a single waveguide the electric field between the top 20 and bottom 18 conductors must be confined to the width 2 of a single waveguide. Electric field confinement may be improved by forming the waveguide separation elements 25 out of a conductive or metallic material.

10. Coupling Light Into Many Separate Ribbons

The efficiency of the display is greatly improved by positioning a focusing element 142 between the light source 132 and the ribbon stack 136. Without a focusing element 138, light will be absorbed in the supercladding 26 and cladding 24 and very little will travel through the core 28. The focusing element insures light from the source 44 is directed into the ribbon cores 28.

Multiple ribbon segments must be placed next to each other, side by side, to cover a screen area wider than one ribbon. Directing light from a source into the cores of many separate ribbons, placed next to each other, is normally difficult to accomplish. The end and prism coupling techniques previously shown may be used. However, as noted, these methods are expensive; requiring the careful alignment of precision optical components. These methods become more difficult as the size of the screen increases.

An alternative approach to coupling light into ribbons is to stack them on top of each other. Light is more easily launched into ribbons stacked on top of one another. Stacking ribbons is preferred to traditional end and prism couping because it reduces the size of the light source 50 and focusing optics 52.

Figure 23:
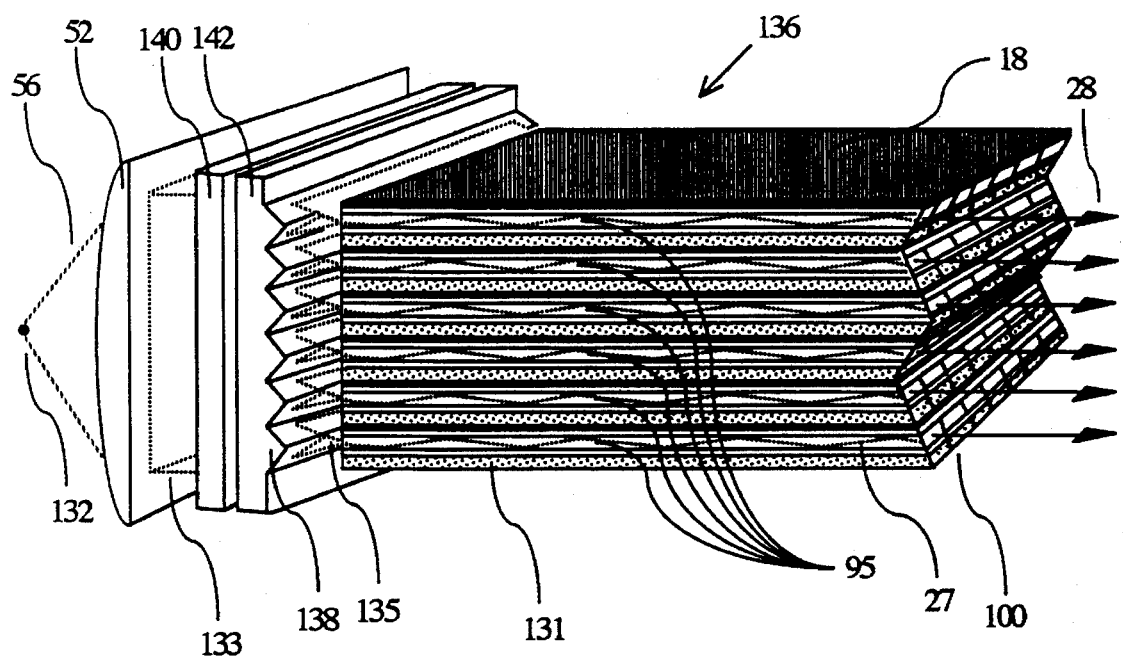
FIG. 23 is a perspective view of a method to precisely couple light into a stack of waveguide ribbons.

FIG. 23 details how light is directed into a stack of waveguide ribbons. Light 56 from a continuous strip source 132 is tightly focused 52 into a collimated beam 133. Light sources which may be used include quartz-halogen and xenon-arc lamps. Light from halogen and xenon sources is typically "white" and contains a broad-spectrum of high and low wavelength light. Other potential light sources may employ pulsed and/or coherent light.

In the preferred embodiment, broad-spectrum white light must be filtered 140 before it enters the ribbon cores. Filtering removes potentially damaging infra-red and ultra-violet components in the white light. Light leaving the filter then passes through a focusing lens 142 before it is directed into the ribbon cores 95.

The focusing lens 142 contains a series of small focusing elements shown here as ridges 138. Each focusing element 138 serves to direct light into the the ribbon waveguide cores. The angle of the light exiting the focusing elements 138 determines the mode of the light propagating through the waveguide. If the angle is great, light will propagate through the core in a high order mode. Light in a high mode is more easily coupled out via acousto-optic and electro-optic taps. The focusing elements 138 provide a precise means for determining the mode of light traveling through the ribbon cores 95. Surface Micro Integrated Lens Array's (SMILE) made by Corning is an example of a promising lens array technology suitable for use in this application.

The small focusing elements 138 also keep the parallel beam of light 133 from hitting the ends of the cladding 18 and diffusing layers 131 where light will be absorbed. Focusing light directly into the cores keeps it from being wasted by hitting the diffusing and cladding layers. Eliminating light coupling inefficiencies by using small focusing lens elements 138 allows smaller, less-power consuming illumination sources to be used in the display.

Focusing optics based on graded index lenses (GRIN) can also be used. GRIN lenses allow a parallel beam of light to be focused to a very small size. GRIN lenses are commonly used to focus collimated laser light into single mode telecommunications fibers. Multiple GRIN microlenses may be positioned between the source 132 and the ribbons 136 to focus light 135 into the ribbon cores 95.

To properly align the focusing lens 142, ribbons must be precisely stacked 60 on top of each another. Slight ribbon spacing irregularities make it difficult to align focused light 58 into the ribbon stack 60. To precisely space the ribbons apart, a spacing material may be positioned between individual ribbons in the stack. (Not Shown) The uniform spacing material will insure each ribbon is flat and spaced an exact distance from other ribbons in the stack.

A mechanical alignment system (Not Shown ) can also correct source to ribbon focusing errors. Many different mechanical systems may be envisioned which align source light into the ribbon cores 95. For example, bending, compressing and dynamically adjusting the ribbon stack and focus optics may be used to insure source/core light coupling.

Figure 24:
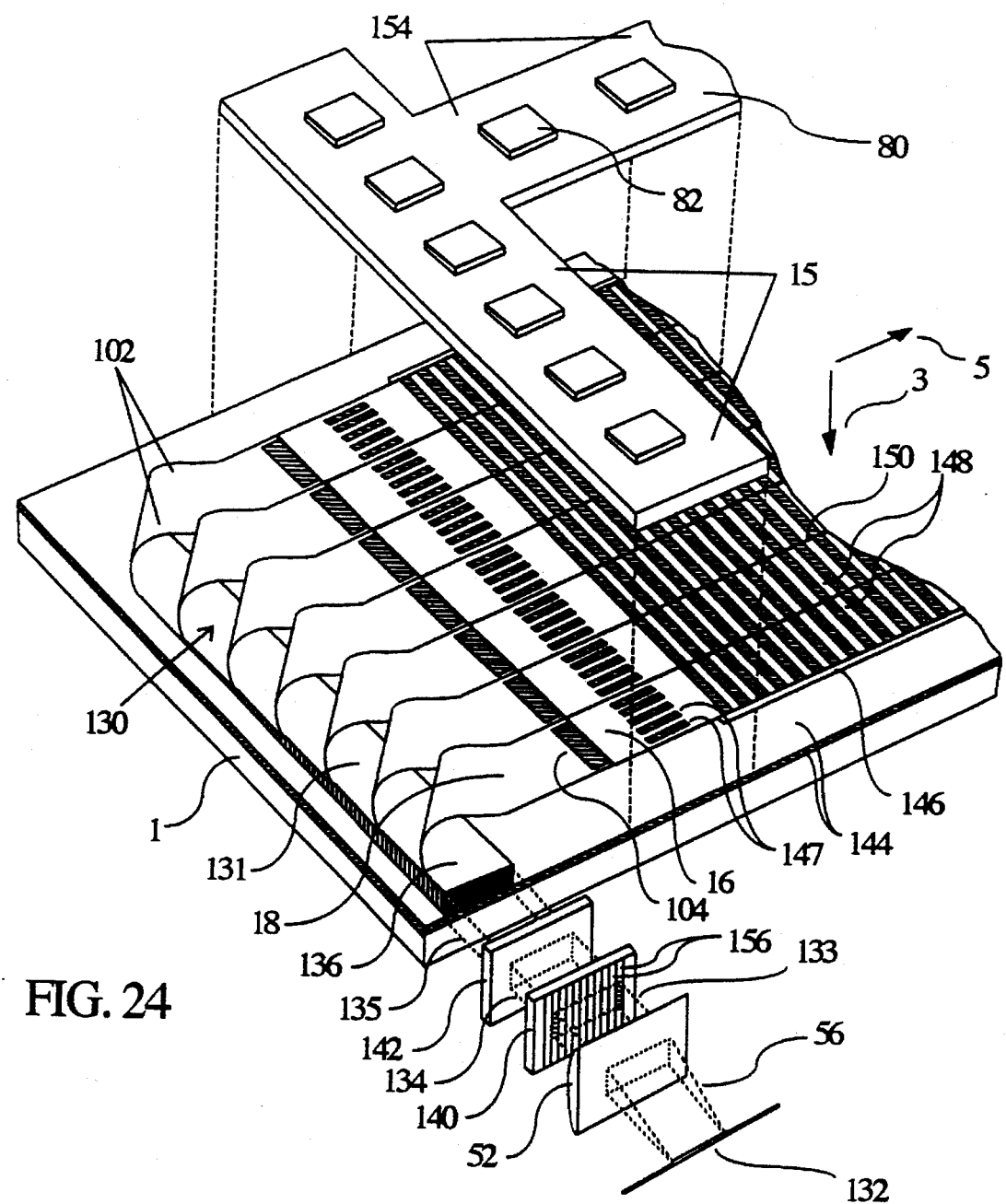
FIG. 24 is an exploded perspective view of a complete display made up of waveguide ribbons.

The light source 132 shown in FIG. 24 is positioned to the side of the display. By bending the light path 56 with mirrors, prisms, fiber optics and/or lenses the light source 44 can be placed in different locations. For example, light can be guided a long distance to the screen by fiber optics. Or alternatively, the light source 44 can be placed in the front of the screen and directed into the ribbons by a prism and mirrors. Flexibility in light source placement gives the screen designer many options to reduce and adjust the screen size.

11. A Ribbon-Based Display System

FIG. 24 shows a perspective backside view of the entire display screen. The screen comprises multiple separate ribbons 130 that are initially stacked 136 on top of each other. Individual ribbons in the stack 136 are folded 102 and fanned out side-by-side to cover a clear window 146 formed in the substrate 1. Light from a source 132 is focused 52 into a collimated beam 133, colored 134 and passed through a lens 142 focusing structure before entering 135 the ribbon cores 28.

Guided light traveling direction 5 first encounters the intensity modulators 147. Intensity modulators control the amount of light flowing through the waveguides which reaches the taps 148. Light deflected out of the intensity modulators 147 is blocked by an opaque material deposited on the ribbon, or substrate 144, and is not seen by the viewer. Only when guided light reaches the taps 148 can it travel through the clear substrate window 146 to the viewer.

Both the intensity modulators 147 and tap 148 electrodes are formed on an exposed side of the waveguide ribbon. Exposing the electrodes simplifies the connection of the drive electronics to the intensity modulators. Specifically, a PC board and other opaque wiring can be placed directly on the backside of the ribbons without altering the screen appearance.

Ribbons are fixed to the substrate using an adhesive. Ribbons may be attached to the substrate by heat, pressure, epoxy, or light catalyzed plastic. In general, any non-visual impairing means can be used to affix ribbons to the substrate. A preferred adhesive is an light or heat curable plastic. The plastic is applied as a thin liquid over the substrate. Ribbons are then positioned and aligned next to each other on the substrate while the plastic is in a liquid form. The plastic, while in a liquid form, causes minimal friction between the ribbon and the substrate. Low friction allows ribbons to be easily positioned and precisely aligned. When the ribbons are in the proper place, light is applied to the plastic, causing it to harden and fixing the ribbons to the substrate.

Many different light sources 44 may be used to illuminate the screen. A few examples included xenon arc, quartz halogen, plasma, electroluminescent, laser and LED sources. A xenon arc source is preferred because it produces a bright: small-size, light source which is easy to collimate. Also, the broad-spectrum output of a xenon arc lamp enables it to be used in color displays.

A number of methods can be used to form color images. In general, the color emitted from the taps 37 is determined by the color of the light 58 traveling through the waveguides. Therefore, if the the light source 44 is monochromatic, the color emitted from the screen will be monochromatic. To make a color screen, different colors of light must travel through the waveguide cores 28.

One light coloring method relies on physically moving a coloring filter in front of a white light source. (Not Shown) In this scheme, a filter containing red, green and blue components is attached to a voicecoil-like device and rapidly moved in front of a white light beam. Light passing through the moving filter is colored before entering 58 the waveguide cores. Full color screen images are created, one frame color at a time, as the filter moves in front of the source. This technique reduces the number of needed screen pixels since each tap deflector emits a number of different colors in rapid succession.

A related light coloring method is based on rapidly strobing multiple light sources. (Not Shown) Each light source is positioned to direct a different color of light into the waveguide ribbon cores. Different colors are strobed to produce different color screen images. By strobing different color lamps in rapid succession a full color picture is generated.

Yet another possible light coloring method is coloring white light after it exits the deflectors. A color filter element is positioned between the ribbon, diffusing layer and substrate. (Not Shown) White light exiting the deflectors is passed through the coloring filter before reaching the viewer.

Initially, light 56 from a strip light source 132 is focused into a collimated beam 133. This collimated beam is then passed through a filter 140. The filter removes damaging ultraviolet and infrared light components. In addition, the filter can contain red, green and blue (RGB) stripes 156 running vertically down its length. These RGB stripes allow only one color of light to enter into each of the waveguide cores contained in the ribbons. In other words, by using filters, a particular ribbon core 95 can be made to only carry one of the three primary light colors. The specific color carried by a ribbon core is chosen so RGB patterns alternate across the ribbon. Coloring light prior to its entry into the ribbon cores allows the entire panel to display color images.

Colored light 134 from the filter 140 is passed through a focusing lens 142 and directed into the ribbon waveguide cores. The focusing lens contains numerous lens elements 138. (not shown) These lens elements efficiently couple light into the ribbon cores 130, without allowing it to hit the cladding 20, 24 and diffusing 131 layers. Once in the cores, guided light travels through the bend region 102, in each ribbon, where it is redirected in direction 5.

The amplitude of the light contained in the ribbon cores is first modulated by the intensity modulators 147. Intensity modulators regulate the brightness of light contained in each ribbon core 130 independently. Intensity modulated light continues in direction 5 until it is made visible at one of the taps 148. Taps direct brightness controlled light out of the core and to the viewer in direction 3.

Figure 25:
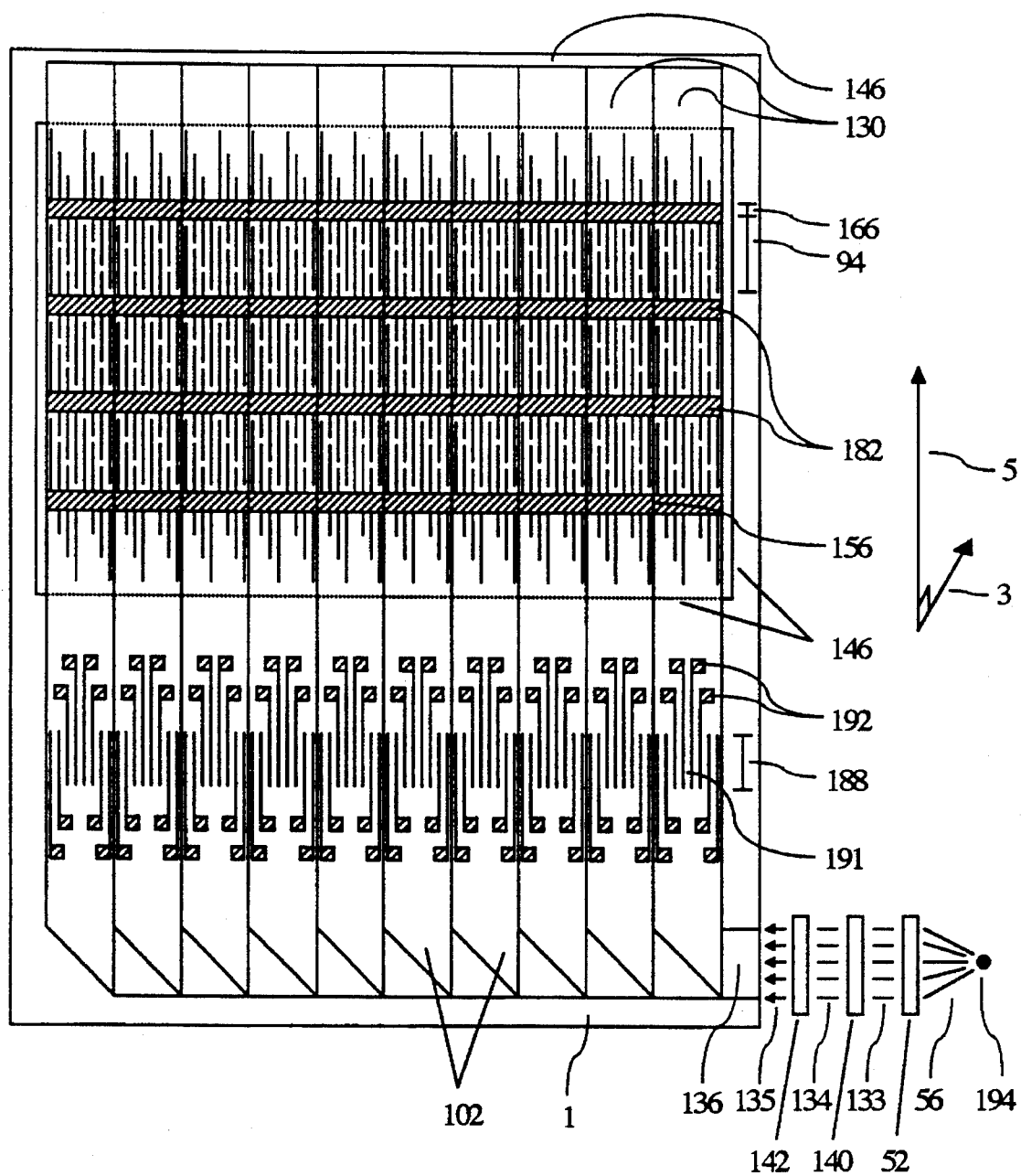
FIG. 25 is a backside view of a complete display comprising a light source, multiple ribbons bent and spread to cover a substrate, intensity modulators and tap elements.

The taps shown in FIG. 25 look different than the taps shown in FIG. 24. The taps 148 shown in FIG. 24 form a staggered pixel pattern. Staggered pixels are commonly used in commercial color CRT's. In FIG. 24 the taps are straight, running perpendicular to the direction 5 of the optical waveguides. Either straight or staggered taps may be used.

The taps placed on each of the ribbons run as close to the edge of the ribbons 150 as possible. However, because the ribbons are formed separately, a tap on one ribbon will typically not conduct across to a tap placed on a ribbon next to it. Connecting taps on adjacent ribbons, so they conduct, eases the task of connecting the drive electronics. When taps conduct across a number of ribbons, a single tap connection made to one ribbon will control all of the corresponding taps on the rest of the ribbons across the display. Controlling a number of taps with a single connection, greatly reduces the number of needed drive wires.

Many methods can be used to connect taps formed on separate ribbons. These include solder re-flow, wave soldering, conductive epoxy, chemical vapor deposition, ultrasonic wire-bonding and using special tape with conductive regions running perpendicular to its length. Regardless of the means employed, the tap metalization between ribbons is made to conduct in the preferred embodiment of the invention. Connecting taps on adjacent ribbons reduces the number of needed tap drive wires.

The printed circuit board 80 contains integrated circuits 82 to drive the intensity modulators and taps on the display. Conductors feed-through the bottom of the printed circuit board and make contact with intensity modulator and tap conductors placed on the ribbons. The printed circuit board controls the intensity modulators and taps so still and moving images can be formed.

The printed circuit board 80 is shaped like a "T". One segment 152 of the printed circuit board is placed over the intensity modulators. This segment controls the brightness of light in each of the waveguides 95. It also contacts the ground conductors 104 which run in direction 5 under the entire length of the piezoelectric layer 16. The other segment 154 of the printed circuit board controls the taps 148. This segment directs intensity modulated light in the ribbon cores 95 to the viewer.

13. Materials and Manufacturing of Waveguides

Optical waveguides can be constructed from many different materials including silicon dioxide, glass, polysiloxane, and polymeric materials. Presently, waveguides based on plastics such as polymethyl methacrylate (PMMA), polystyrene, polyimide and polycarbonate are preferred. Plastics are important because they are easy to form and shape. Plastics can be extruded, rolled, laminated, stamped, pressed, spun, dipped, molded and drawn. In addition, waveguides can be formed in plastic materials by photolocking, thermo-poling, ion implantation, ion migration, etching, and machining.

Certain polymers also have very large electro-optic and ferroelectric properties. In fact, recently synthesized polymers have been reported which have electro-optic effect as large as $LiNbO_3$; an inorganic crystal with one of the highest electro-optic coefficients yet discovered. For example, a promising electro-optic polymeric material is discussed by J. R. Hill el. al., in a Sep. 1, 1988 *Journal of Applied Physics* article entitled "Demonstration of the linear electro-optic effect in a thermopoled polymer film".

This versatility makes plastics ideally suited as a display building material. Critical waveguide elements, such as the core and cladding can be made of polymeric waveguide materials such as PMMA and polysterene. The active waveguide switching elements, i.e.—the supercladding, can be made of new electro-optic materials. For example, the supercladding can be formed out of thermo-poled electrooptic plastic. Thus, plastics can be used in both passive and active display elements.

There are many ways to form polymer waveguides. One method is called photolocking and was pioneered by E. A.

Chandross and C. A. Pryde at Bell Laboratories. Photolocking is based on optically recording refractive-index patterns in polymer films. For example, a polymer base such as PMMA and a dopant can be cast from solution in a solvent to form a solid. Light from a laser beam, or other light source, is then used to expose the solid dopant and base. Exposure to light causes the dopant to photopolymerize and become locked to the base material. The residual dopant, which was not exposed to light, is evaporated out of the base by exposing the sample to heat. The regions where the dopant is locked to the base have a different index of refraction then the rest of the polymer.

Another polymer waveguide manufacturing approach is called thermo-poling. This technique is described by J. I. Thackara el. al. in *Appl. Phys. Lett.*, 1988, 52, page 1031. In this method, electrodes are deposited on either side of a solid nonlinear or ferroelectric polymer. The polymer is then heated to its glass transition temperature and an electric field is applied to the electrodes in order to align the molecules in the softened polymer. The electrical ordering of the molecules causes the polymer between the electrodes to undergo a change in refractive index which follows the pattern of the electrodes. The polymer is then cooled, while maintaining the electric field. Once cooled, the electric field is removed and a permanent change in the index of refraction is "frozen" into the polymer. After thermo-poling, some polymers may be piezoelectric in addition to being electro-optic.

Figure 26A:
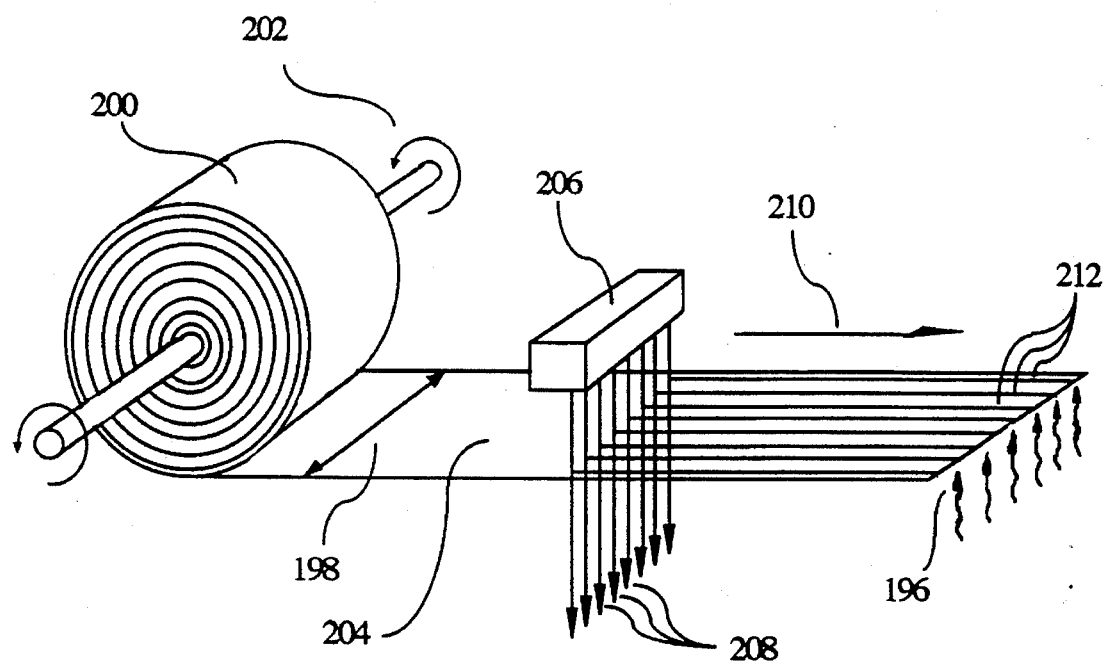
FIG. 26A shows a photolocking process used to manufacture optical waveguide ribbon.

Both photolocking and thermo-poling enable plastic waveguide ribbon to be economically manufactured. For example, many parallel waveguides can be exposed in thin plastic sheets by photolocking. FIG. 26A shows thin plastic film 204 being exposed to parallel beams of light 208 in order to form parallel waveguides 212. The exposed film is then heated 196 to fix and develop the waveguides. Finally, the film is laminated between two separate lower index sheets to form cladding layers.

Figure 26B:
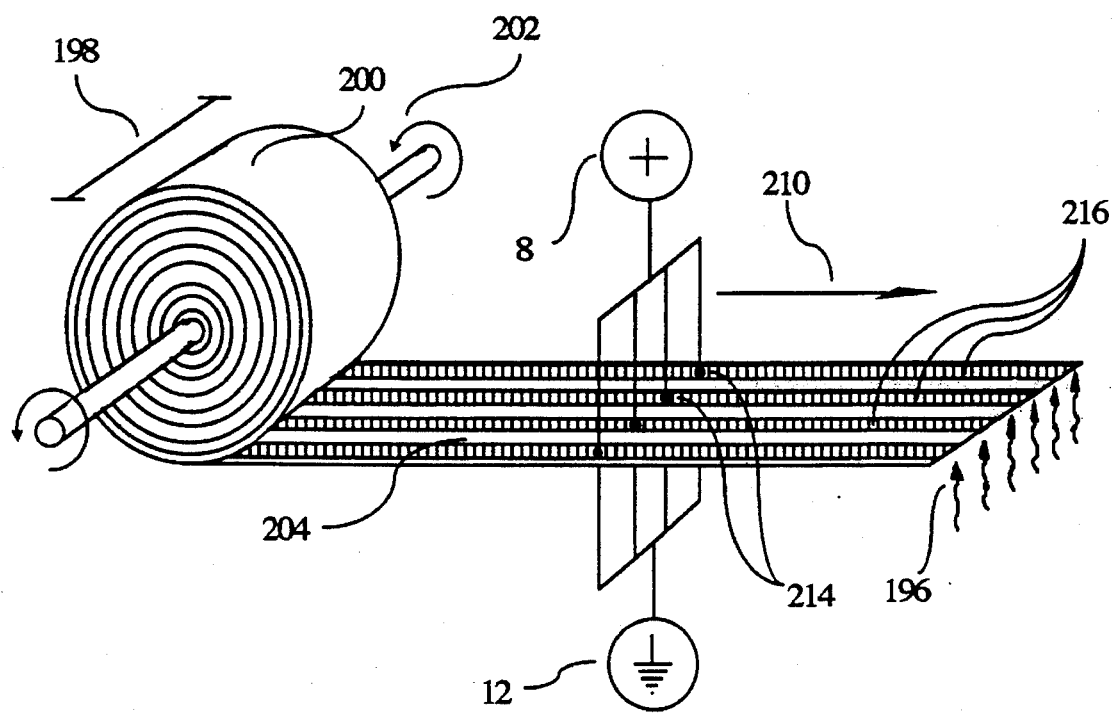
FIG. 26B shows a thermo-poling process used to manufacture optical waveguide ribbon.

Thermo-poling, shown in FIG. 26B, may also be used to make economical plastic waveguide ribbon. Instead of using light to form waveguides, the film is heated 196 and exposed to an electric field 8,12 and 214. A plastic film consisting of laminated electro-optic and non-electro-optic plastic layers can be deposited with metal electrodes 204. Electrodes deposited on the laminated plastic film define waveguide regions.

The entire plastic/electrode structure is then heated 196 while applying a large electric field to the electrodes. The electric field defines high index waveguide regions in the electro-optic polymer layers where the electrodes have been deposited. Thermo-poling allows a very large number of electro-optic waveguides to be formed in parallel.

The film used in the thermo-poling or photolocking may be very wide 198 sheets of plastic rolled onto spools. Automatic processing machines can form large numbers of waveguides in wide plastic sheets in parallel. Only after processing is it necessary to cut waveguide sheets down to smaller ribbon sizes.

In fact, it may not .be necessary to cut wide waveguide sheets into thin ribbons at all. If an inexpensive light source is developed which is extremely thin and long, light can be end-coupled into wide, un-cut, polymer waveguide sheets. Thus, instead of separate ribbons 130, a single large sheet can be used to cover the display window 146.

Figure 27A:
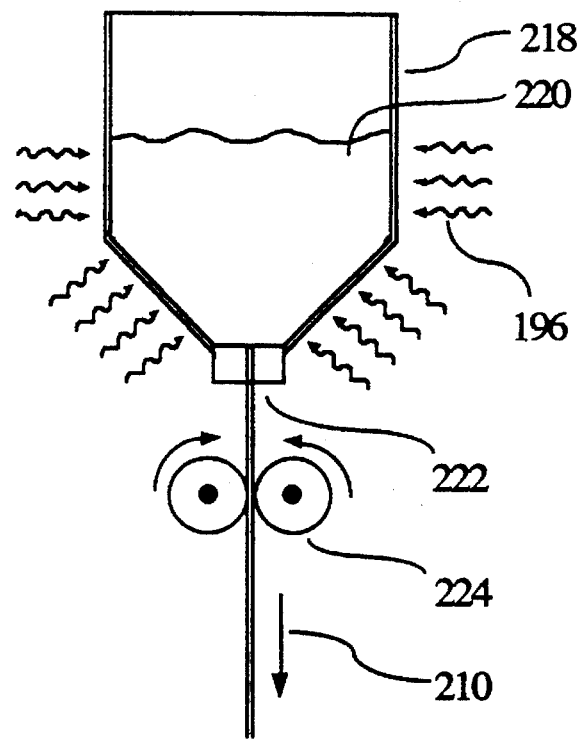
FIG. 27A shows a side view of a extrusion process used to manufacture waveguide ribbon.
Figure 27B:
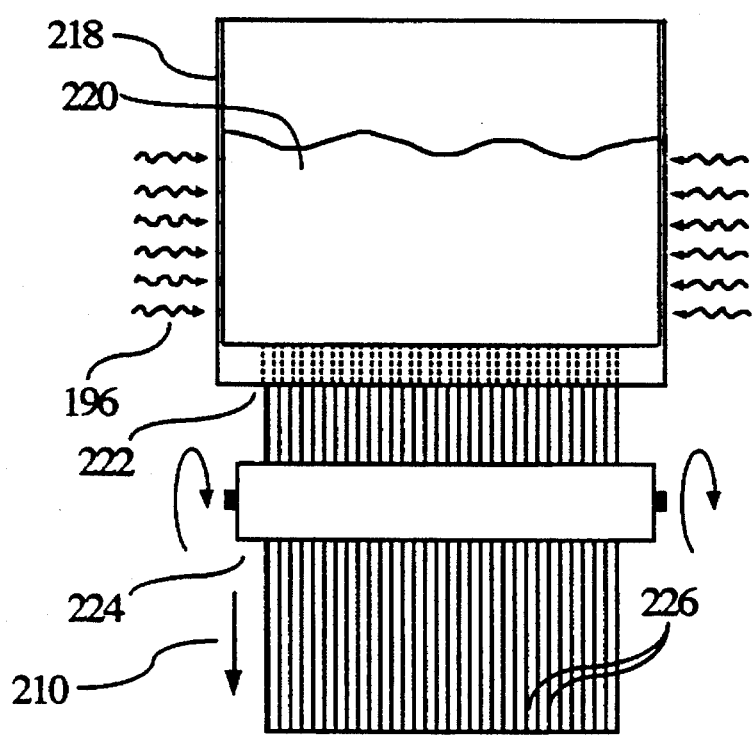
FIG. 27B shows a front view of the extrusion manufacturing process shown in FIG. 27A.

Extrusion, shown in FIG. 27A and 27B, is a different waveguide manufacturing technique. A quantity of material is heated so it can be drawn or pushed through an opening in a die 222. Very complicated shapes can be formed depending on the shape of the die opening. A continuous, multi-step, polymer extrusion process may be used to form waveguide ribbon.

Figure 28:
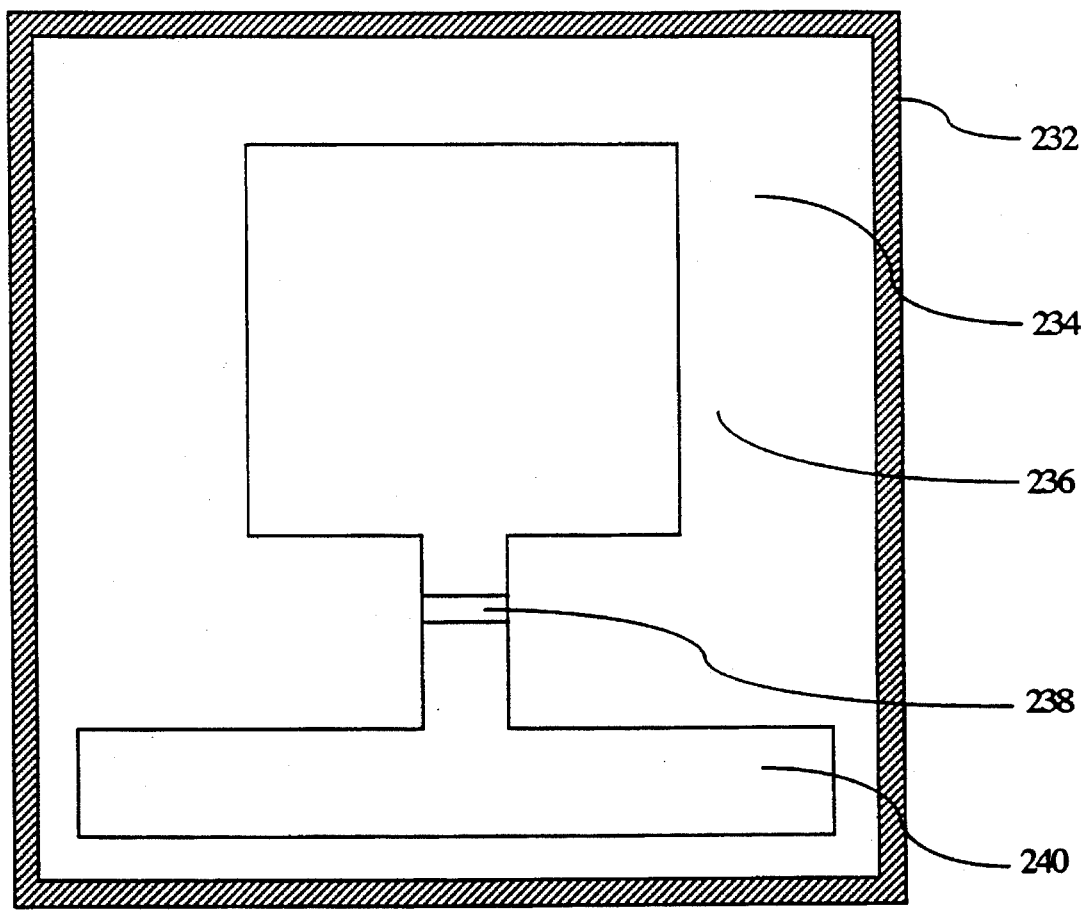
FIG. 28 shows a end-cut view of a single fiber preform.
Figure 29:
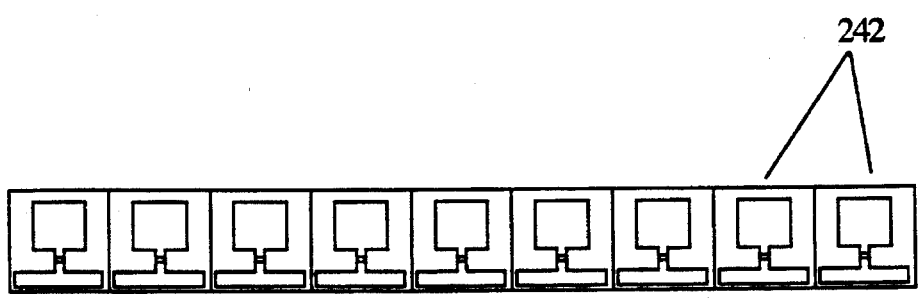
FIG. 29 shows an end-cut view of a multi-fiber preform.
Figure 30:
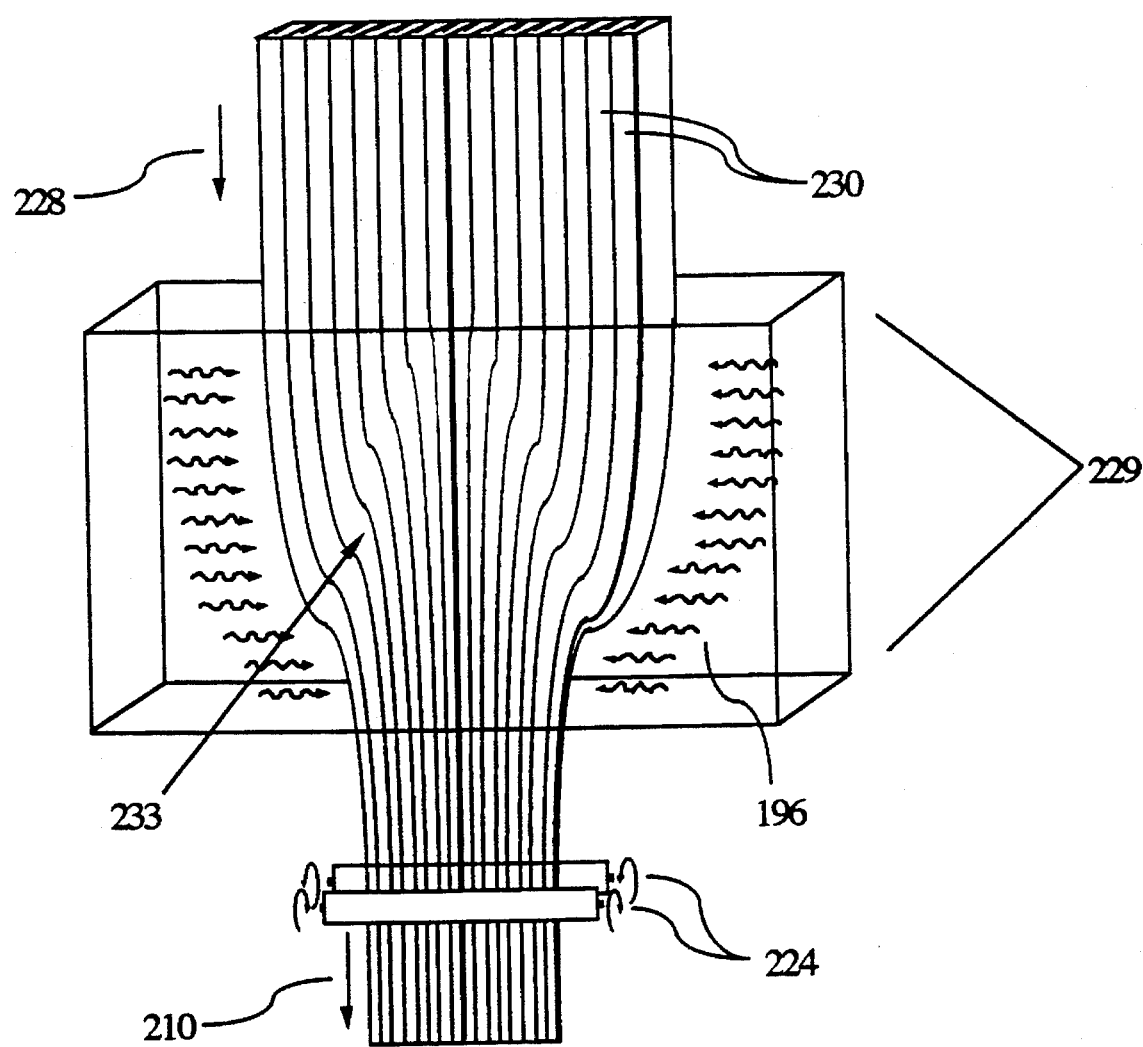
FIG. 30 shows a multi-fiber preform being stretch drawn in a furnace.

Traditional fiber drawing may also be used. Fiber preforms shown in FIG. 28 larger than the size of the final fiber can be heated and stretch drawn to a smaller size. Many individual preforms, FIG. 29, may be heated and drawn down in parallel as shown in FIG. 30. The resulting plurality of individual fibers can be combined, either before or after the drawing process, into a ribbon-like structure.

Figure 31:
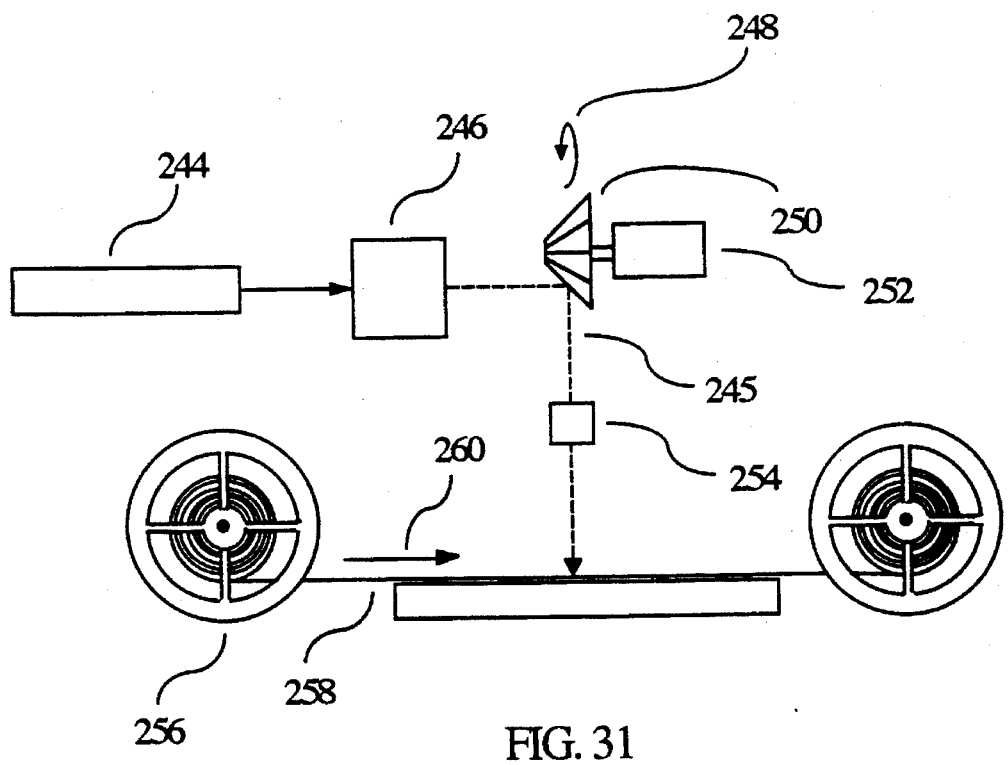
FIG. 31 shows a piezoelectric film electrode formation process.
Figure 32:
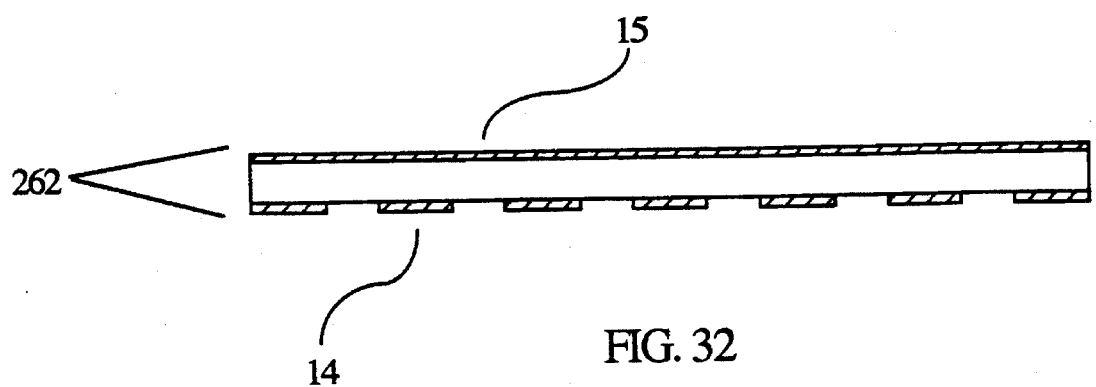
FIG. 32 shows an end-cut view of a segment of piezo ribbon which includes electrodes.

FIG. 31 shows an electrode formation process based on laser removal of metal on the ribbon. A laser beam 244 is modulated 246 and scanned across the ribbon via a rotating mirror 250 attached to a motor 252. A ribbon is moved across the scanning beam and the metal is removed from the plastic backing. FIG. 32 shows an end-cut view of the final ribbon.

Figure 33:
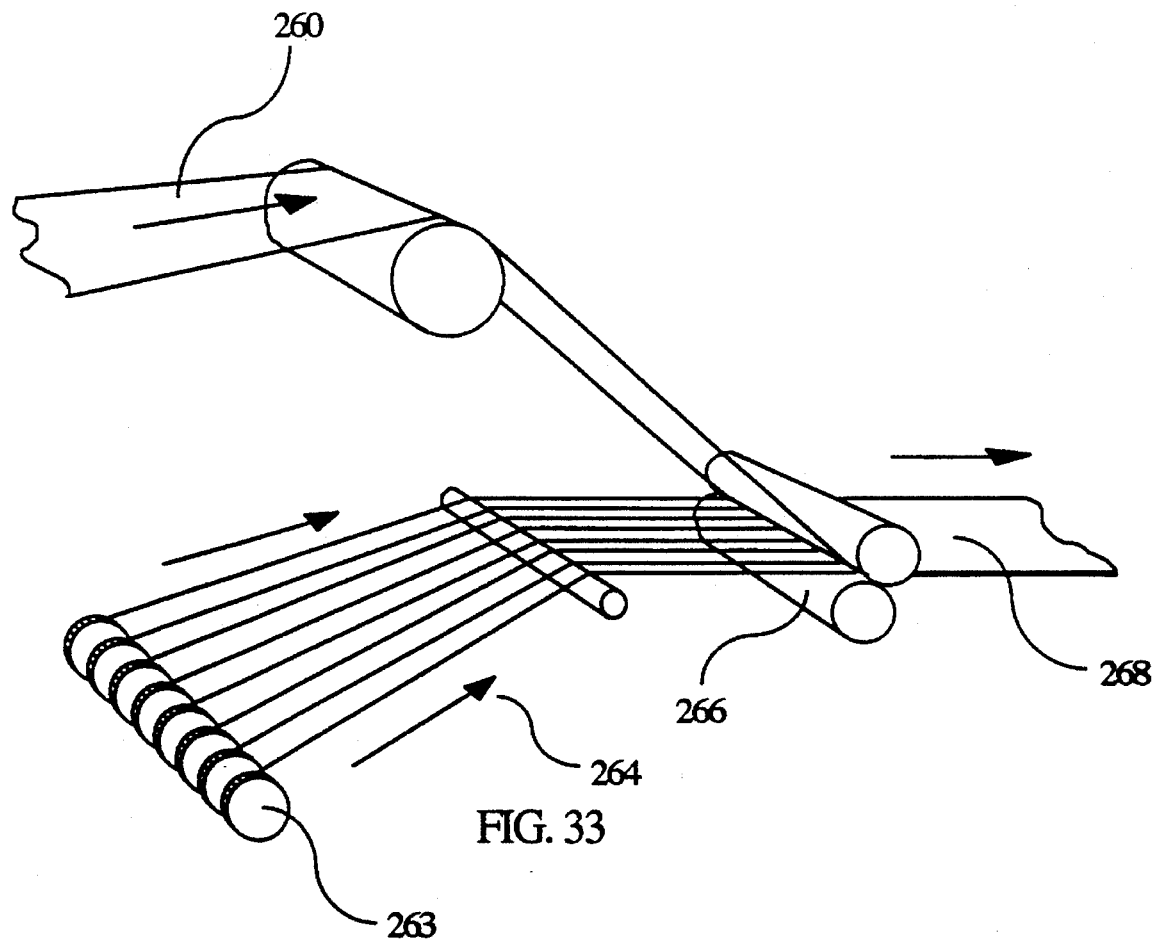
FIG. 33 shows the ribbon and the fibers being combined into a single unit.
Figure 34:
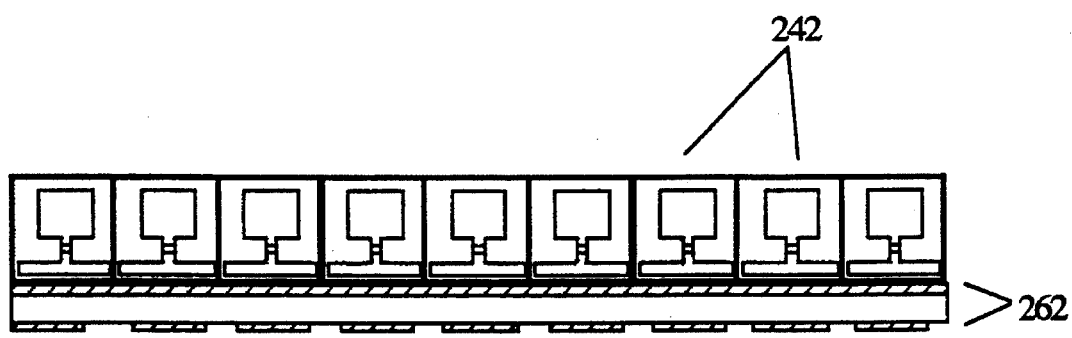
FIG. 34 shows an end-cut view of a ribbon after the fibers and film have been combined.

FIG. 33 shows how fibers pulled down from the fiber pulling process are attached to the ribbon. Fibers on separate spools 263 are attached to a plastic ribbon with electrodes formed on it. The entire structure is laminated between two rollers 266 to form the waveguide ribbon 268.

Figure 35:
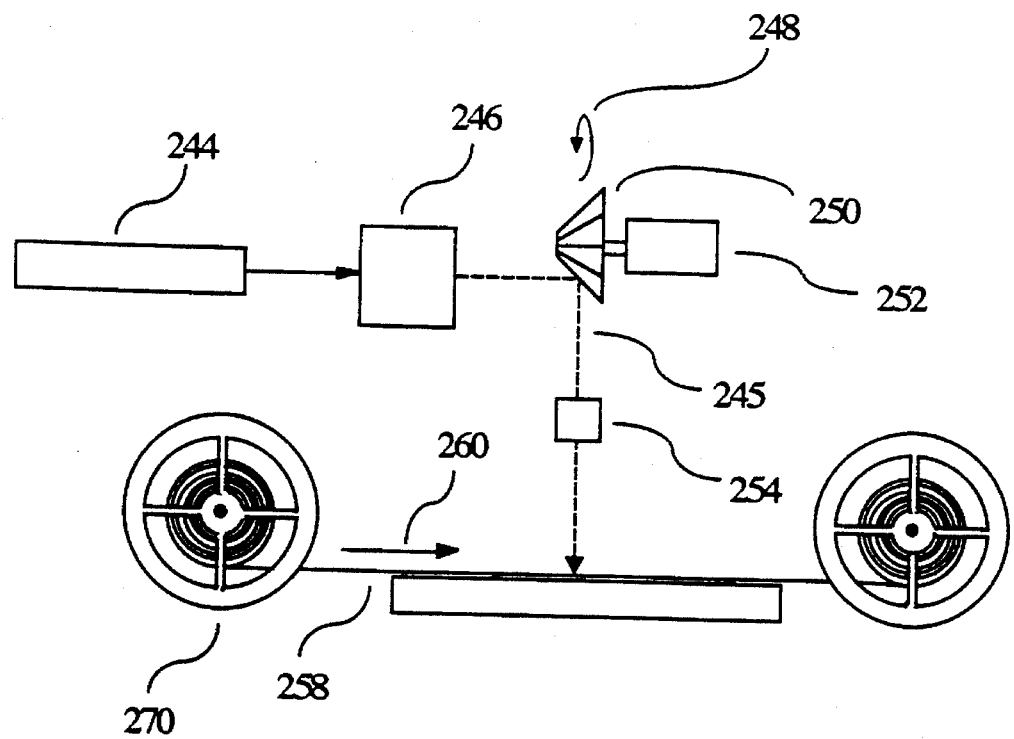
FIG. 35 shows a laser pit formation process.
Figure 36:
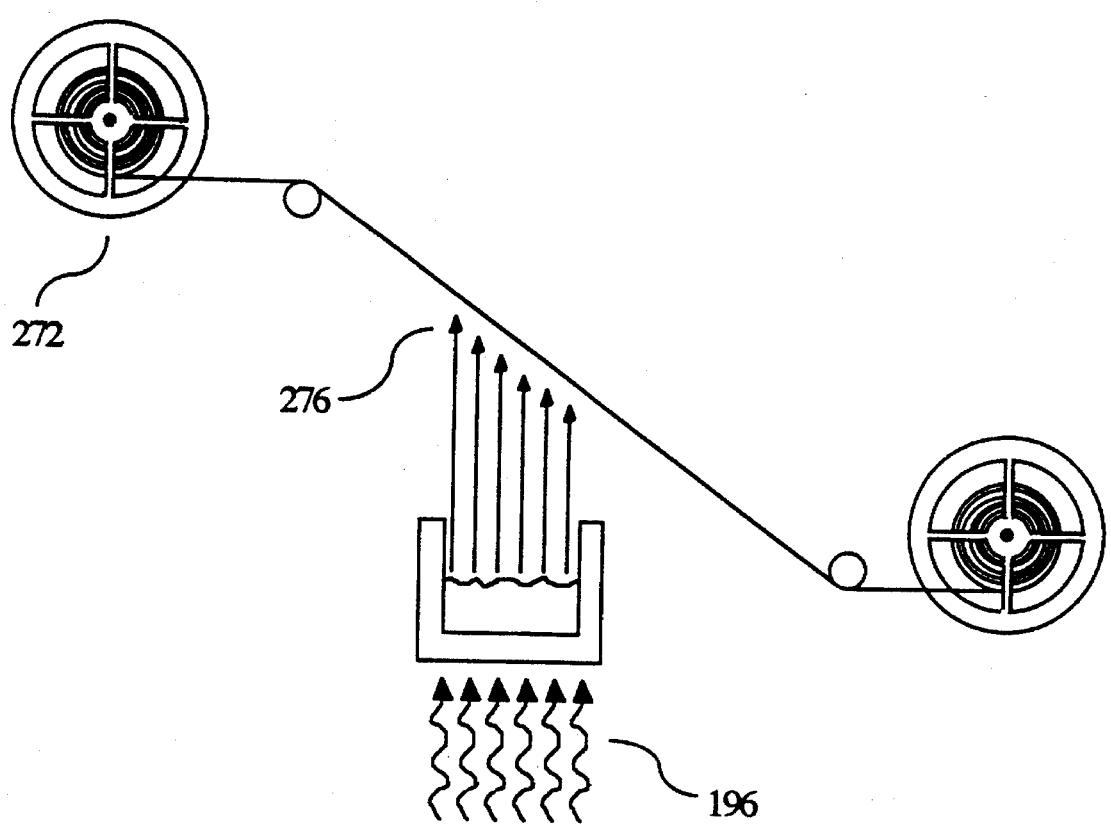
FIG. 36 shows the ribbon being metalized to form reflective pits.

Deflectors in the waveguide supercladding can be formed by chemical etching, laser burning, ion milling, and stamping. Presently, the preferred deflector fabrication method is to use laser milling. FIG. 35 shows a scanning laser beam, similiar to that shown in FIG. 31, which is used to form deflector pits. After the pits have been formed, metal is evaporated on to the ribbon 276.

A different deflector fabrication method is hot stamping. A heated plate can be stamped or rolled against the supercladding. Protrusions in the plate form indentations in the supercladding which are subsequently coated, preferably metalized, to deflect light. Hot stamping may also prove useful in creating many parallel optical waveguides in thin plastic sheets.

Figure 37:
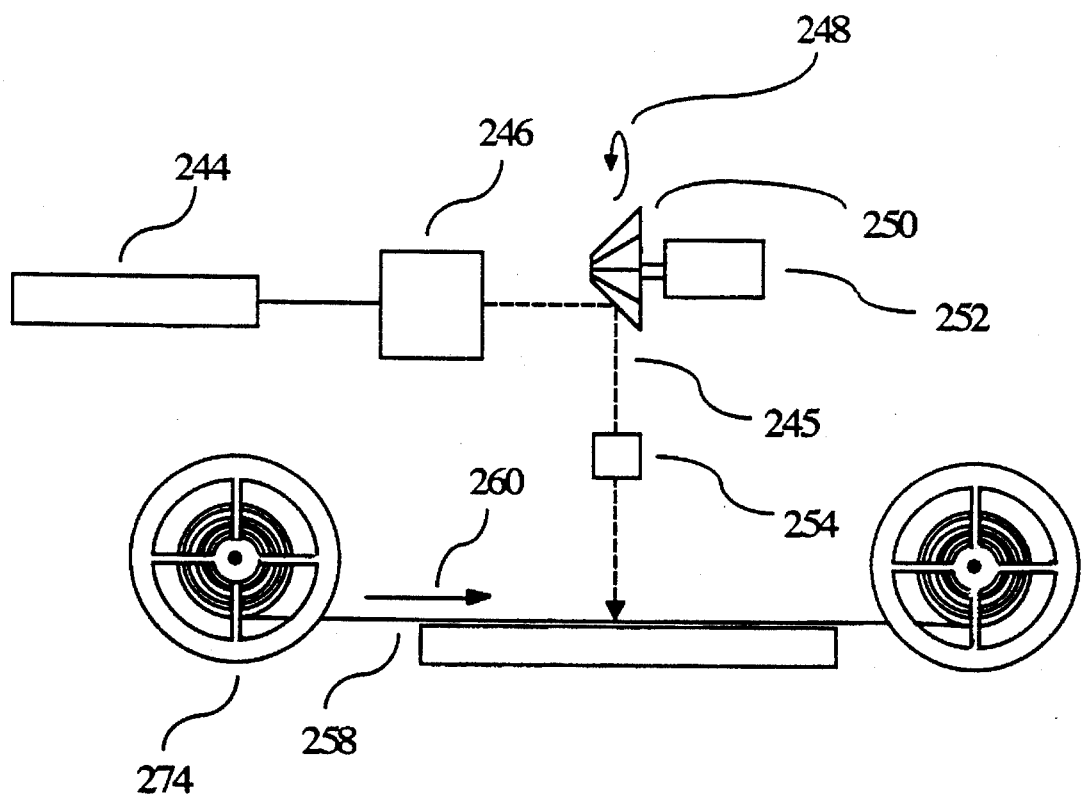
FIG. 37 shows how excess metal deposited on the ribbon is removed.
Figure 38:
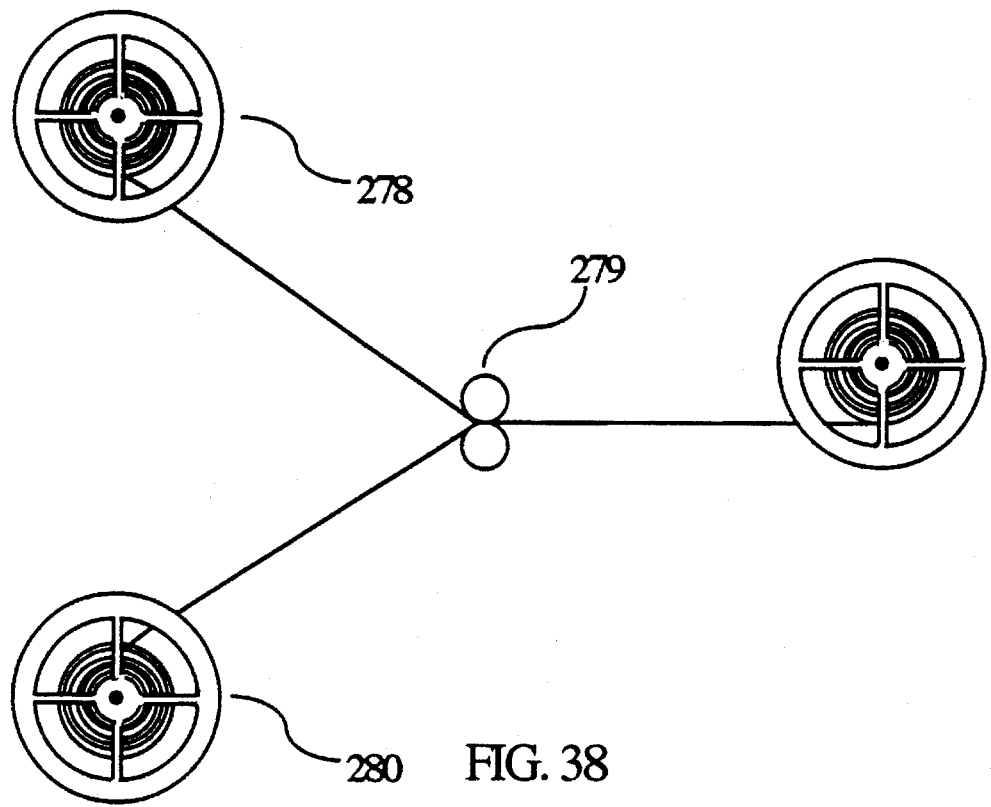
FIG. 38 shows how the ribbon and a lens structure are combined.
Figure 39A:
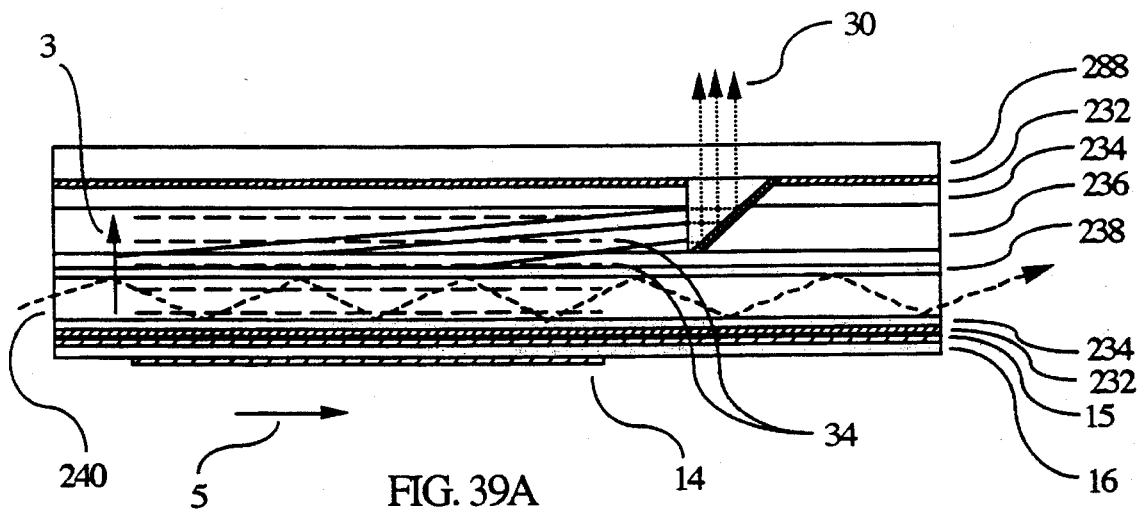
FIG. 39A shows a side view of the final ribbon structure.
Figure 39B:
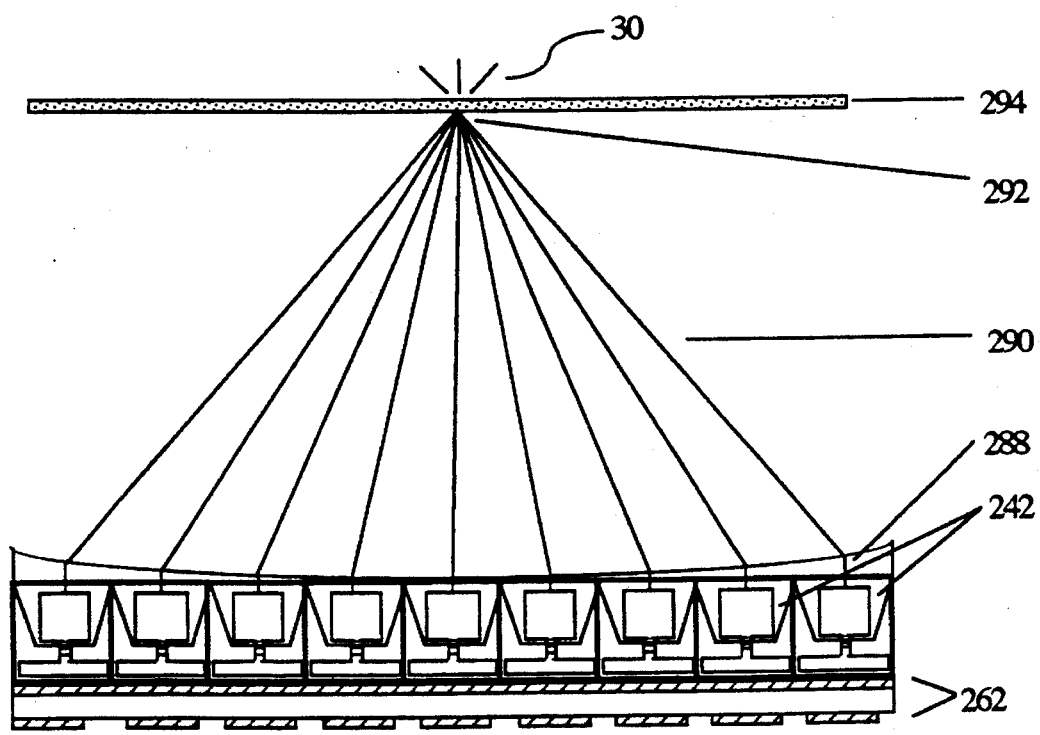
FIG. 39B shows an end view of the final ribbon structure.

After the pits have been metalized, excess metal is again removed with the laser based metalization removal system (FIG. 37). Finally, a lens is attached to the ribbon to focus light in vertical columns on separate waveguides which must be aligned. FIGS. 39A and 39B show end and side views of the final ribbon structure.

It is obvious that many combinations of the above techniques exist. For example, a preform containing electro-optic plastic can be stretch drawn into a thin fiber. The drawn fiber can then be thermo-poled to align the electro-optic material within the fiber. Or, ribbon can be be partially extruded, then heated and stretched, in a modified fiber drawing process. Since variations on the above techniques are too numerous to describe, combinations of the mentioned manufacturing techniques should be included within the scope of this discussion.

14. Driving the Intensity Modulators and Taps

Figure 40:
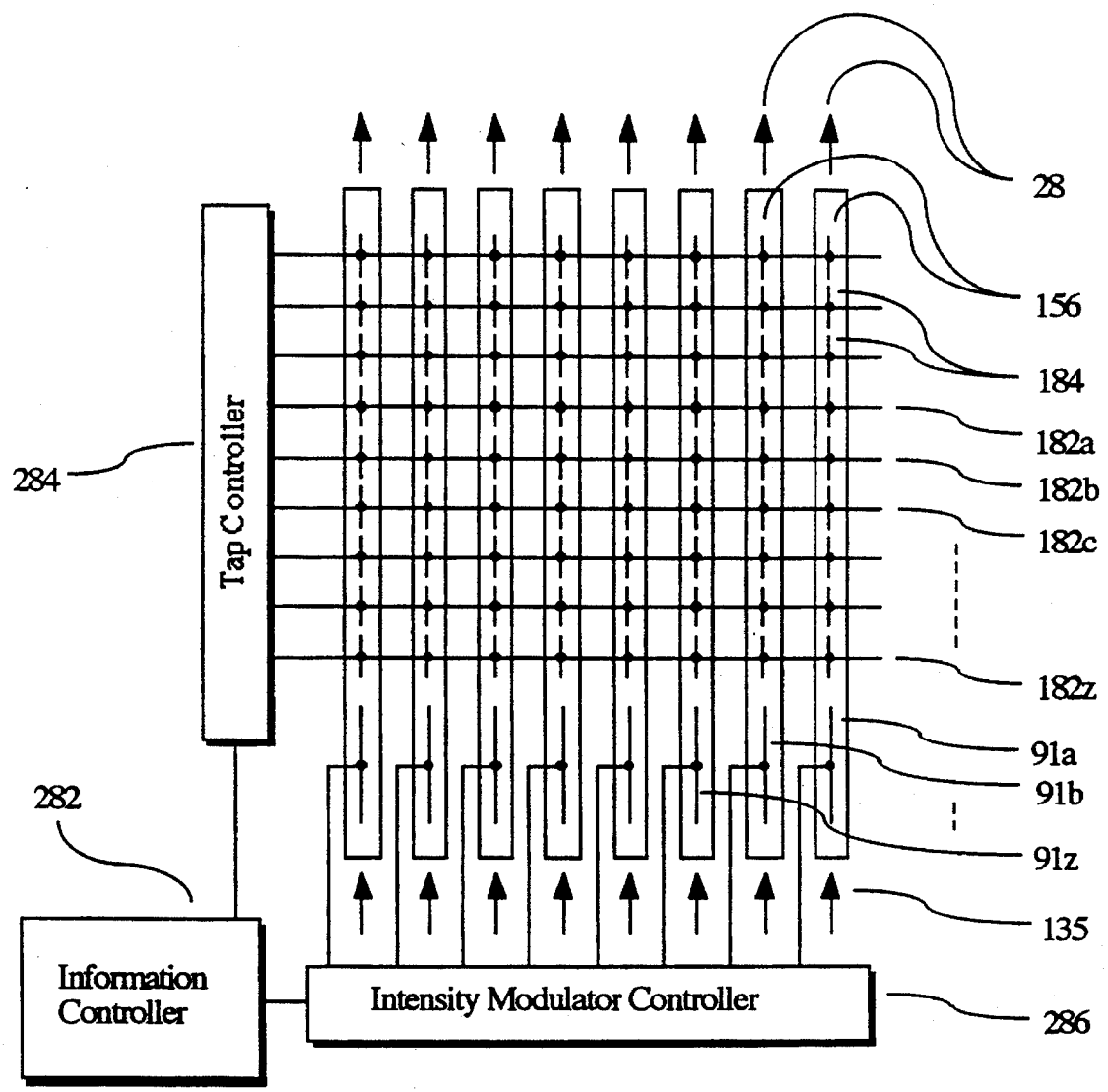
FIG. 40 is a schematic view of the electronic control systems used in the display.

FIG. 40 is a schematic of the optical waveguide display. Video information passes through the Information Controller 282 and is used to drive the Tap Controller 284 and the Intensity Modulator Controller 286. The Tap Controller 284 selects a single tap row 182a, 182b, 182c. . . or 182z. This causes light to exit the waveguides 156 at any selected tap row 182 and travel to the viewer. The amount of light flowing through each waveguide is controlled by the intensity modulators 91 in parallel. Thus, when a particular tap row is selected, the amount of light traveling through each waveguide to the selected tap row is controlled by the intensity modulators. By rapidly cycling through all of the rows 182, and adjusting the intensity modulators 91 in parallel, complete screen images are formed. Grey scale values are created by the time duration the intensity modulators 91 are operated.

RAMIFICATIONS AND CONCLUSIONS

While this application contains many specifics, the reader should not construe these as limitations on the scope of the invention. Rather, they are merely exemplifications of the preferred embodiments. Those skilled in the art will envision many other possible variations that are apparent given the ideas presented here.

All the waveguides shown in this application are either square or rectangular. Other waveguide profiles which have rounded corners, are circular, triangular or hexagonal may also be substituted instead. In general, a waveguide profile need only be capable of guiding light for it to be used in the disclosed display.

A different type of acoustic tap which uses surface acoustic waves could also be used. Surface acoustic waves propagate within several acoustic wavelengths of the top of a substrate. Consequently, surface acoustic waves concentrate a great deal of sound energy into a small region located near the surface of a material. Thus, surface waves could be particularly useful when tapping light traveling through thin-film optical waveguides.

Sound generated from a piezoelectric polymer such as Polyvinylidenefluoride (PVDF) may be launched into a plastic cladding, glass core, waveguide. An acoustic resonance can be generated in the plastic cladding which is sandwiched between the glass core and the PVDF transducer. Cladding resonance lowers the tap drive power by reusing acoustic energy already transmitted into the waveguide.

Another tap approach might employ liquid crystals as a waveguide cladding layer. In practice, one side of the waveguide cladding could be formed by applying a thin layer of liquid crystals. It is well known that liquid crystals change their index of refraction in the presence of an electric field. Electrodes placed on either side of the core, and the liquid crystal cladding layer, could be used to control the light emitted from the waveguide core. Electric signals applied to the electrodes will alter the orientation, and thus the index of refraction, of the liquid crystals in the cladding layer. These changes in the index of refraction will allow light to exit the core and travel to the viewer. Solid polymers with second order effects based on pendant side chain groups are of considerable interest.

The diffusing layer could also be formed separately on the substrate. This is in contrast to integrating the diffusing layer directly onto the ribbon or fibers. Placing the diffusing layer on the substrate helps conceal slight visual imperfections caused when arranging separate ribbons or fibers next to each other. It also allows the ribbon to stay thinner, so it is easier to work with.

Similarly, color filters could also be deposited directly on the substrate, ribbons or fibers. Instead of coloring light prior to its entry in each of the waveguides, all waveguides could be made to carry white light. White light tapped out of the cores could then be colored by passing it through color filters on its way to a viewer.

Multiple illumination sources and multiple ribbons can be used to illuminate the panel. For example, by placing large numbers of ribbons side-by-side extremely large screens can be made. Multiple light sources will be required to supply large numbers of waveguide ribbons.

Some illumination sources may produce excess heat which can damage screen components. For example, a plastic ribbon will easily melt if placed too close to an arc lamp. A means must be provided to control excess heat generated from the light source. For example a fan, liquid radiator, semiconductor and/or passive convection cooling system may be added to regulate screen temperatures.

The electronic control systems needed to control the many intensity modulators and taps have not been specified. Obviously, many different types of well-known electronic components and circuits can be used to control the intensity modulators and taps. For example, in the case of electro-optic taps, a high voltage DC signal may need to be applied to the conductors. Or in the case of acousto-optic Bragg diffraction taps, high frequency signals will need to be applied. It may also be necessary to place memory on the screen to buffer and store a full frame image. Furthermore, special circuits may be required to provide power to the light source and drive electronics. The circuits which apply and coordinate electrical signals to form screen images are clearly implied by what has been shown and should be included within the scope of the invention.

Due to manufacturing irregularities, individual ribbon waveguides 1 will attenuate light at different rates. Irregular waveguide losses can cause the screen image to have an uneven brightness across the surface of the screen. Thus, it may be necessary to electronically adjust the amount of light flowing through each waveguide individually to make a screen image with uniform brightness.

Lastly, the substrate itself might also be made extremely thin and flexible. A thin, flexible, substrate will allow the screen to rolled up. This enables the display to be stored in a small space when it is not being used. It might also be necessary to place a conductive envelope around the entire substrate to protect the environment from the emission of radio frequency electro-magnetic signals caused by driving the intensity modulators and taps.

An acoustic speaker can be placed behind the screen to generate audible sound. Sound from a speaker mounted directly behind the screen can propagate to the viewer unencumbered through a very thin optical waveguide screen. Placing the speaker behind the display will give the viewer the impression that sound is coming from pictures and images shown on the screen.

Although the invention is described principally as a method to display images, some individual techniques which form part of the invention have novelty of their own. In particular, the long interaction length waveguide taps and deflectors are believed to be contributions quite different from the prior art. Fibers using this configuration may find use in commercial telecommunication systems. Also, the concept of making a special electro-optic fiber which is capable of switching itself, is believed to be a new idea.

While the invention has been described with reference to a preferred embodiment thereof, it will be appreciated by those of ordinary skill in the art that changes can be made to the structure and function of the parts without departing from the spirit and scope of the basic invention. Accordingly, the reader should help determine the scope of the invention by the appended claims and their legal equivalents, and not solely by the examples which have been given.

What is claimed is:

1. A display system comprising:

a plurality of optical waveguides, each including first and second associated optical waveguide cores, a light source for supplying light to said plurality of optical waveguides, a controllable light exiting means for selectively causing at least a portion of the light to selectively pass from said first core to said second core, and a visible-light-absorbing material layer placed with respect to said plurality of optical waveguides in order to darken the appearance of images formed by said plurality of optical waveguides and said controllable light exiting means.

2. The display system as claimed in claim 1 in which said controllable light exiting means is an electro-optic, acousto-optic, thermo-optic or magneto-optic device.

3. The display system as claimed in claim 1 in which said controllable light exiting means is an optically diffractive, refractive or evanescent field coupling device.

4. The display system as claimed in claim 1 in which said plurality of optical waveguides are placed between the observer and said visible light absorbing material.

5. The display system as claimed in claim 1 in which said visible light absorbing material is placed between the individual waveguides in said plurality of optical waveguides.

6. The display system as claimed in claim 1 in which said visible light absorbing material is placed between said plurality of optical waveguides and the observer.

7. The display system as claimed in claim 6 in which said visible light absorbing material completely absorbs all of the light from said controllable light exiting means.

8. The display system as claimed in claim 6 in which said visible light absorbing material keeps light from said light exiting means in a well defined region located near said optical waveguides.

* * * * *